(12) United States Patent
Cui et al.

(10) Patent No.: US 12,302,232 B2
(45) Date of Patent: May 13, 2025

(54) INTERFERENCE PROCESSING METHOD AND DEVICE

(71) Applicant: HUAWEI TECHNOLOGIES CO., LTD., Guangdong (CN)

(72) Inventors: Liwei Cui, Xi'an (CN); Yufeng Hu, Xi'an (CN); Ding Wang, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 570 days.

(21) Appl. No.: 17/614,627

(22) PCT Filed: May 26, 2020

(86) PCT No.: PCT/CN2020/092274
§ 371 (c)(1),
(2) Date: Nov. 29, 2021

(87) PCT Pub. No.: WO2020/238888
PCT Pub. Date: Dec. 3, 2020

(65) Prior Publication Data
US 2022/0225225 A1    Jul. 14, 2022

(30) Foreign Application Priority Data

May 30, 2019 (CN) .............................. 201910465177

(51) Int. Cl.
*H04W 48/18* (2009.01)
*H04B 17/318* (2015.01)
(Continued)

(52) U.S. Cl.
CPC .......... *H04W 48/18* (2013.01); *H04B 17/318* (2015.01); *H04B 17/336* (2015.01); *H04W 52/243* (2013.01); *H04W 84/12* (2013.01)

(58) Field of Classification Search
CPC ........................ H04W 88/06; H04W 52/04–60
See application file for complete search history.

(56) References Cited

U.S. PATENT DOCUMENTS 9,907,085 B2    2/2018  Li et al.
2011/0300805 A1  12/2011 Gaikwad et al.
(Continued)

FOREIGN PATENT DOCUMENTS

CN    101877879 A    11/2010
CN    102714799 A    10/2012
(Continued)

OTHER PUBLICATIONS

Office Action issued in CN201910465177.1, dated Mar. 29, 2021, 9 pages.
(Continued)

*Primary Examiner* — Joseph A Bednash

(57) ABSTRACT

Embodiments of this application provide an interference processing method and a device, to reduce interference from a cellular network to Wi-Fi signals by reducing uplink transmit power of the cellular network in the field of communications technologies. According to the interference processing method: If a wireless access device determines that there is a Wi-Fi device whose signal status parameter is less than a first threshold in connected Wi-Fi devices, the uplink transmit power of the cellular network is greater than or equal to a second threshold, and a signal status parameter of the cellular network is greater than or equal to a third threshold, and/or determines that a Wi-Fi rate of a Wi-Fi device with a smallest signal status parameter in the connected Wi-Fi devices is less than a fourth threshold, and an air interface throughput of the cellular network is greater than or equal to a fifth threshold, the wireless access device reduces the uplink transmit power of the cellular network, to reduce interference from a cellular signal to a Wi-Fi signal. The embodiments of this application are used for interference processing.

20 Claims, 15 Drawing Sheets

(51) Int. Cl.
  *H04B 17/336* (2015.01)
  *H04W 52/24* (2009.01)
  *H04W 84/12* (2009.01)

(56) References Cited

U.S. PATENT DOCUMENTS

| | | | | |
|---|---|---|---|---|
| 2012/0207040 | A1* | 8/2012 | Comsa | H04W 72/1215 370/252 |
| 2013/0258922 | A1 | 10/2013 | Park | |
| 2013/0288742 | A1 | 10/2013 | Yao et al. | |
| 2013/0324113 | A1* | 12/2013 | Jechoux | H04W 72/1215 455/553.1 |
| 2014/0199963 | A1* | 7/2014 | Mohebbi | H04W 12/069 455/410 |
| 2014/0243041 | A1* | 8/2014 | Zhao | H04W 72/21 455/552.1 |
| 2015/0163752 | A1 | 6/2015 | Appleton | |
| 2016/0219589 | A1* | 7/2016 | Khawer | H04W 24/02 |

FOREIGN PATENT DOCUMENTS

| | | |
|---|---|---|
| CN | 103119992 A | 5/2013 |
| CN | 103384158 A | 11/2013 |
| CN | 104394584 A | 3/2015 |
| CN | 104469818 A | 3/2015 |
| CN | 104822149 A | 8/2015 |
| CN | 105009635 A | 10/2015 |
| CN | 105263186 A * | 1/2016 |
| CN | 105282774 A | 1/2016 |
| CN | 105430663 A | 3/2016 |
| CN | 105519220 A | 4/2016 |
| CN | 106416408 A | 2/2017 |
| CN | 107438283 A | 12/2017 |
| CN | 107864493 A | 3/2018 |
| CN | 109041240 A | 12/2018 |
| KR | 20130110705 A | 10/2013 |
| WO | 2016187134 A1 | 11/2016 |
| WO | 2017151351 A1 | 9/2017 |

OTHER PUBLICATIONS

Notice of Allowance issued in CN201910465177.1, dated Oct. 11, 2021, 5 pages.
International Search Report and Written Opinion issued in PCT/CN2020/092274, dated Aug. 28, 2020, 11 pages.
Extended European Search Report issued in EP20815551.5, dated May 18, 2022, 8 pages.

* cited by examiner

INTERFERENCE PROCESSING METHOD AND DEVICE

This application is a national stage of International Application No. PCT/CN2020/092274, filed on May 26, 2020, which claims priority to Chinese Patent Application No. 201910465177.1, filed with the China National Intellectual Property Administration on May 30, 2019 and entitled "INTERFERENCE PROCESSING METHOD AND DEVICE". Both of the aforementioned applications are hereby incorporated by reference in their entireties.

TECHNICAL FIELD

Embodiments of this application relate to the field of communications technologies, and in particular, to an interference processing method and a device.

BACKGROUND

A wireless router may connect to the Internet through a cellular network, and then provide a network access function for a user through wireless fidelity (Wi-Fi). A frequency band (namely, a frequency range) used by the cellular network may cause interference to a frequency band used by Wi-Fi. For example, when a frequency band used by the cellular network for uplink transmission is relatively close to the frequency band used by Wi-Fi, the cellular network may cause spurious interference to Wi-Fi. When a frequency used by the cellular network overlaps a frequency band used by Wi-Fi, the cellular network may cause co-channel interference to Wi-Fi on the overlapping frequency band. The interference may cause a poor user-perceived rate when the user uses Wi-Fi to access the network, and even cause the user to fail to access the network.

For example, uplink transmission of the cellular network on a long term evolution (LTE) B41 (2496 MHz to 2690 MHz) frequency band may cause spurious interference to some 2.4G Wi-Fi (2400 MHz to 2483.5 MHz) frequency bands. When the wireless router uses the B41 frequency band, and spurious interference is caused to 2.4G Wi-Fi channels 11 to 13, the 2.4G Wi-Fi channels 11 to 13 may be switched to 2.4G Wi-Fi channels 1 to 10, to avoid or reduce the interference to Wi-Fi.

In some cases, the wireless router cannot perform interference processing by switching a channel.

SUMMARY

Embodiments of this application provide an interference processing method and a device, to reduce interference from a cellular network to Wi-Fi by reducing uplink transmit power of the cellular network.

To achieve the foregoing objective, the following technical solutions are used in the embodiments of this application.

According to an aspect, an embodiment of this application provides a communications system. The communications system includes a wireless access device and at least one wireless fidelity (Wi-Fi) device, and the wireless access device includes a cellular module and a Wi-Fi module. The wireless access device is configured to: access the Internet and receive a cellular signal by using the cellular module, convert the cellular signal into a Wi-Fi signal, and send the Wi-Fi signal by using the Wi-Fi module. The Wi-Fi device is configured to receive the Wi-Fi signal and access a Wi-Fi network. The wireless access device is further configured to: if it is determined that a first preset condition or a second preset condition or both are met, reduce uplink transmit power of a cellular network, to reduce interference from the cellular signal to the Wi-Fi signal. The first preset condition includes: There is a Wi-Fi device whose signal status parameter is less than a first threshold in connected Wi-Fi devices, the uplink transmit power of the cellular network is greater than or equal to a second threshold, and a signal status parameter of the cellular network is greater than or equal to a third threshold, where the signal status parameter includes a received signal strength parameter and a signal quality parameter. The second preset condition includes: A Wi-Fi rate of a Wi-Fi device with a smallest signal status parameter in the connected Wi-Fi devices is less than a fourth threshold, and an air interface throughput of the cellular network is greater than or equal to a fifth threshold.

In the communications system, the wireless access device may convert the cellular signal into the Wi-Fi signal, so that the Wi-Fi device can access the Wi-Fi network. The wireless access device may further determine, based on signal statuses or rates of the cellular network and Wi-Fi, whether to perform interference processing. When determining to perform interference processing, the wireless access device may reduce the uplink transmit power of the cellular network, to reduce the interference from the cellular signal to the Wi-Fi signal.

In a possible design, the first threshold includes a sixth threshold or a seventh threshold, and the Wi-Fi device whose signal status parameter is less than the first threshold is a Wi-Fi device whose received signal strength parameter is less than the sixth threshold or whose signal quality parameter is less than the seventh threshold. The Wi-Fi device with the smallest signal status parameter is a Wi-Fi device with a smallest received signal strength parameter or a smallest signal quality parameter. The third threshold includes an eighth threshold and a ninth threshold, and that a signal status parameter of the cellular network is greater than or equal to a third threshold includes: The received signal strength parameter of the cellular network is greater than or equal to the eighth threshold, and the signal quality parameter of the cellular network is greater than or equal to the ninth threshold.

In other words, a small received signal strength parameter or a small signal quality parameter may indicate a small signal status parameter, and a large received signal strength parameter and a large signal quality parameter may indicate a large signal status parameter.

In another possible design, the first preset condition further includes: There is a Wi-Fi device using 2.4G Wi-Fi, and a frequency band used by the cellular network has full-band interference to 2.4G Wi-Fi. Alternatively, the first preset condition further includes: There is a Wi-Fi device using 5G Wi-Fi, and a frequency band used by the cellular network has interference to 5G Wi-Fi.

In this way, a condition for triggering interference processing is stricter, and frequent entry and exit of interference processing can be avoided.

In another possible design, the wireless access device is further configured to: if no Wi-Fi device is connected, or if there is no Wi-Fi device whose signal status parameter is less than the first threshold in the connected Wi-Fi devices, or if 2.4G Wi-Fi is used but 5G Wi-Fi is not used, and the frequency band used by the cellular network has no interference to 2.4G Wi-Fi, or if 5G Wi-Fi is used but 2.4G Wi-Fi is not used, and the frequency band used by the cellular network has no interference to 5G Wi-Fi, or if the received signal strength parameter of the cellular network is less than a tenth threshold, or if the signal quality parameter of the cellular network is less than an eleventh threshold, stop reducing the uplink transmit power of the cellular network.

In this solution, the wireless access device may improve the uplink transmit power of the cellular network in a timely manner when interference processing does not need to continue, to ensure normal use of the cellular signal.

In another possible design, the wireless access device is further configured to: if it is determined that there is a Wi-Fi device whose signal status parameter is less than the first threshold and there is a device using 2.4G Wi-Fi in the connected Wi-Fi devices, the frequency band used by the cellular network has full-band interference to 2.4G Wi-Fi, the uplink transmit power of the cellular network is greater than or equal to the second threshold, the signal status parameter of the cellular network is less than a twelfth threshold, the frequency band used by the cellular network has no interference to 5G Wi-Fi, and all the connected Wi-Fi devices support 5G Wi-Fi, switch from 2.4G Wi-Fi to 5G Wi-Fi; or if it is determined that there is a Wi-Fi device whose signal status parameter is less than the first threshold and there is a device using 5G Wi-Fi in the connected Wi-Fi devices, the frequency band used by the cellular network has interference to 5G Wi-Fi, the uplink transmit power of the cellular network is greater than or equal to the second threshold, the signal status parameter of the cellular network is less than a twelfth threshold, the frequency band used by the cellular network has no interference to 2.4G Wi-Fi, and all the connected Wi-Fi devices support 2.4G Wi-Fi, switch from 5G Wi-Fi to 2.4G Wi-Fi. The twelfth threshold includes the tenth threshold or the eleventh threshold, and that the signal status parameter of the cellular network is less than a twelfth threshold includes: The received signal strength parameter of the cellular network is less than the tenth threshold, or the signal quality parameter of the cellular network is less than the eleventh threshold.

In other words, the wireless access device may alternatively switch a used 2.4G Wi-Fi frequency band or 5G Wi-Fi frequency band, to avoid interference from the cellular network to Wi-Fi.

In another possible design, the wireless access device is further configured to: if it is determined that there is a Wi-Fi device whose signal status parameter is less than the first threshold and there is a device using 2.4G Wi-Fi in the connected Wi-Fi devices, the frequency band used by the cellular network has interference to 2.4G Wi-Fi, and all the connected Wi-Fi devices support 5G Wi-Fi, switch from 2.4G Wi-Fi to 5G Wi-Fi; or if it is determined that there is a Wi-Fi device whose signal status parameter is less than the first threshold and there is a device using 5G Wi-Fi in the connected Wi-Fi devices, the frequency band used by the cellular network has interference to 5G Wi-Fi, and all the connected Wi-Fi devices support 2.4G Wi-Fi, switch from 5G Wi-Fi to 2.4G Wi-Fi.

In this possible design, the wireless access device may alternatively switch the used 2.4G Wi-Fi frequency band or 5G Wi-Fi frequency band, to avoid interference from the cellular network to Wi-Fi.

In another possible design, the second preset condition further includes: There is a Wi-Fi device whose signal status parameter is less than the first threshold and there is a device using 2.4G Wi-Fi in the connected Wi-Fi devices, and the frequency band used by the cellular network has interference to 2.4G Wi-Fi. Alternatively, the second preset condition further includes: There is a Wi-Fi device whose signal status parameter is less than the first threshold and there is a device using 5G Wi-Fi in the connected Wi-Fi devices, and the frequency band used by the cellular network has interference to 5G Wi-Fi.

In this way, the condition for triggering interference processing is stricter, and frequent entry and exit of interference processing can be avoided.

In another possible design, the wireless access device is further configured to: if no Wi-Fi device is connected, or if there is no Wi-Fi device whose signal status parameter is less than the first threshold in the connected Wi-Fi devices, or if 2.4G Wi-Fi is used but 5G Wi-Fi is not used, and the frequency band used by the cellular network has no interference to 2.4G Wi-Fi, or if 5G Wi-Fi is used but 2.4G Wi-Fi is not used, and the frequency band used by the cellular network has no interference to 5G Wi-Fi, or if the received signal strength parameter of the cellular network is less than the tenth threshold or the signal quality parameter of the cellular network is less than the eleventh threshold, and the Wi-Fi rate of the Wi-Fi device with the smallest signal status parameter is greater than or equal to a thirteenth threshold, or if the received signal strength parameter of the cellular network is less than the tenth threshold or the signal quality parameter of the cellular network is less than the eleventh threshold, and the air interface throughput of the cellular network is less than a fourteenth threshold, stop reducing the uplink transmit power of the cellular network.

In this solution, the wireless access device may improve the uplink transmit power of the cellular network in a timely manner when interference processing does not need to continue, to ensure normal use of the cellular signal.

In another possible design, the wireless access device is further configured to: if it is determined that there is a Wi-Fi device whose signal status parameter is less than the first threshold and there is a device using 2.4G Wi-Fi in the connected Wi-Fi devices, the frequency band used by the cellular network has interference to 2.4G Wi-Fi, the Wi-Fi rate of the Wi-Fi device with the smallest signal status parameter is less than the fourth threshold, the air interface throughput of the cellular network is less than the fourteenth threshold, the frequency band used by the cellular network has no interference to 5G Wi-Fi, and all the connected Wi-Fi devices support 5G Wi-Fi, switch from 2.4G Wi-Fi to 5G Wi-Fi; or if it is determined that there is a Wi-Fi device whose signal status parameter is less than the first threshold and there is a device using 5G Wi-Fi in the connected Wi-Fi devices, the frequency band used by the cellular network has interference to 5G Wi-Fi, the Wi-Fi rate of the Wi-Fi device with the smallest signal status parameter is less than the fourth threshold, the air interface throughput of the cellular network is less than the fourteenth threshold, the frequency band used by the cellular network has no interference to 2.4G Wi-Fi, and all the connected Wi-Fi devices support 2.4G Wi-Fi, switch from 5G Wi-Fi to 2.4G Wi-Fi.

In other words, the wireless access device may alternatively switch the used 2.4G Wi-Fi frequency band or 5G Wi-Fi frequency band, to avoid interference from the cellular network to Wi-Fi.

In another possible design, the received signal strength parameter includes reference signal received power RSRP or a received signal strength indicator RSSI. The signal quality parameter includes a signal to interference plus noise ratio SINR or reference signal received quality RSRQ.

In this embodiment of this application, the received signal strength parameter may be represented by using the RSRP, the RSSI, or another parameter, and the signal quality parameter may be represented by using the SINR, the RSRQ, or another parameter.

In another possible design, the wireless access device is further configured to: after reducing the uplink transmit power of the cellular network to reduce the interference from the cellular signal to the Wi-Fi signal, display first prompt information.

In this way, a user can conveniently learn that interference processing is currently performed.

In another possible design, the wireless access device is further configured to display second prompt information after stopping reducing the uplink transmit power of the cellular network.

In this way, the user can conveniently learn that interference processing is currently exited.

According to another aspect, an embodiment of this application provides a communications system. The communications system includes a wireless access device and at least one wireless device. The wireless access device includes a first wireless module and a second wireless module. The first wireless module supports a first wireless technology, and the second wireless module supports a second wireless technology. The wireless access device is configured to: access a first wireless network and receive a first wireless signal by using the first wireless module, convert the first wireless signal into a second wireless signal, and send the second wireless signal by using the second wireless module. The wireless device is configured to receive the second wireless signal and access a second wireless network that supports the second wireless signal. The wireless access device is further configured to: if it is determined that a first preset condition or a second preset condition or both are met, reduce uplink transmit power of the first wireless signal, to reduce interference from the first wireless signal to the second wireless signal. The first preset condition includes: There is a wireless device whose signal status parameter is less than a first threshold in connected wireless devices, the uplink transmit power of the first wireless signal is greater than or equal to a second threshold, and a signal status parameter of the first wireless signal is greater than or equal to a third threshold, where the signal status parameter includes a received signal strength parameter and a signal quality parameter. The second preset condition includes: A communication rate of a wireless device with a smallest signal status parameter in the connected wireless devices is less than a fourth threshold, and a communication rate of the first wireless signal is greater than or equal to a fifth threshold.

In the communications system, the wireless access device may convert the first wireless signal into the second wireless signal, so that the wireless device accesses the second wireless network that supports the second wireless signal. The wireless access device may further determine, based on signal statuses or communication rates of the first wireless signal and the second wireless signal, whether to perform interference processing. When determining to perform interference processing, the wireless access device may reduce the uplink transmit power of the first wireless signal, to reduce the interference from the first wireless signal to the second wireless signal.

In a possible design, the first wireless technology is a cellular communications technology, the first wireless signal is a cellular signal, the second wireless technology is a Wi-Fi communications technology, and the second wireless signal is a Wi-Fi signal.

In this case, the wireless access device may reduce uplink transmit power of the cellular signal, to reduce interference from the cellular signal to the Wi-Fi signal.

In another possible design, the first wireless technology is a Wi-Fi communications technology, the first wireless signal is a Wi-Fi signal, the second wireless technology is a cellular communications technology, and the second wireless signal is a cellular signal.

In this case, the wireless access device may reduce uplink transmit power of the Wi-Fi signal, to reduce interference from the Wi-Fi signal to the cellular signal.

According to another aspect, an embodiment of this application provides a wireless access device, including: one or more processors; a memory; a cellular module, configured to access the Internet and receive a cellular signal by the wireless access device; a wireless fidelity (Wi-Fi) module, configured to send a Wi-Fi signal by the wireless access device; and one or more computer programs, where the one or more computer programs are stored in the memory, and the one or more computer programs include instructions. When the instructions are executed by the one or more processors, the wireless access device is enabled to perform the following steps: converting the cellular signal received by the cellular module into the Wi-Fi signal; and if it is determined that a first preset condition or a second preset condition or both are met, reducing uplink transmit power of a cellular network, to reduce interference from the cellular signal to the Wi-Fi signal. The first preset condition includes: There is a Wi-Fi device whose signal status parameter is less than a first threshold in connected Wi-Fi devices, the uplink transmit power of the cellular network is greater than or equal to a second threshold, and a signal status parameter of the cellular network is greater than or equal to a third threshold, where the signal status parameter includes a received signal strength parameter and a signal quality parameter. The second preset condition includes: A Wi-Fi rate of a Wi-Fi device with a smallest signal status parameter in the connected Wi-Fi devices is less than a fourth threshold, and an air interface throughput of the cellular network is greater than or equal to a fifth threshold.

In this solution, the wireless access device may determine, based on signal statuses or rates of the cellular network and Wi-Fi, whether to perform interference processing. When determining to perform interference processing, the wireless access device may reduce the uplink transmit power of the cellular network, to reduce the interference from the cellular signal to the Wi-Fi signal.

In a possible design, the first threshold includes a sixth threshold or a seventh threshold, and the Wi-Fi device whose signal status parameter is less than the first threshold is a Wi-Fi device whose received signal strength parameter is less than the sixth threshold or whose signal quality parameter is less than the seventh threshold. The Wi-Fi device with the smallest signal status parameter is a Wi-Fi device with a smallest received signal strength parameter or a smallest signal quality parameter. The third threshold includes an eighth threshold and a ninth threshold, and that a signal status parameter of the cellular network is greater than or equal to a third threshold includes: The received signal strength parameter of the cellular network is greater than or equal to the eighth threshold, and the signal quality parameter of the cellular network is greater than or equal to the ninth threshold.

In another possible design, the first preset condition further includes: There is a Wi-Fi device using 2.4G Wi-Fi, and a frequency band used by the cellular network has full-band interference to 2.4G Wi-Fi. Alternatively, the first preset condition further includes: There is a Wi-Fi device using 5G Wi-Fi, and a frequency band used by the cellular network has interference to 5G Wi-Fi.

In another possible design, when the instructions are executed by the one or more processors, the wireless access device is further enabled to perform the following step: if no Wi-Fi device is connected, or if there is no Wi-Fi device whose signal status parameter is less than the first threshold in the connected Wi-Fi devices, or if 2.4G Wi-Fi is used but 5G Wi-Fi is not used, and the frequency band used by the cellular network has no interference to 2.4G Wi-Fi, or if 5G Wi-Fi is used but 2.4G Wi-Fi is not used, and the frequency band used by the cellular network has no interference to 5G Wi-Fi, or if the received signal strength parameter of the cellular network is less than a tenth threshold, or if the signal quality parameter of the cellular network is less than an eleventh threshold, stopping reducing the uplink transmit power of the cellular network.

In another possible design, when the instructions are executed by the one or more processors, the wireless access device is further enabled to perform the following step: if it is determined that there is a Wi-Fi device whose signal status parameter is less than the first threshold and there is a device using 2.4G Wi-Fi in the connected Wi-Fi devices, the frequency band used by the cellular network has full-band interference to 2.4G Wi-Fi, the uplink transmit power of the cellular network is greater than or equal to the second threshold, the signal status parameter of the cellular network is less than a twelfth threshold, the frequency band used by the cellular network has no interference to 5G Wi-Fi, and all the connected Wi-Fi devices support 5G Wi-Fi, switching from 2.4G Wi-Fi to 5G Wi-Fi; or if it is determined that there is a Wi-Fi device whose signal status parameter is less than the first threshold and there is a device using 5G Wi-Fi in the connected Wi-Fi devices, the frequency band used by the cellular network has interference to 5G Wi-Fi, the uplink transmit power of the cellular network is greater than or equal to the second threshold, the signal status parameter of the cellular network is less than a twelfth threshold, the frequency band used by the cellular network has no interference to 2.4G Wi-Fi, and all the connected Wi-Fi devices support 2.4G Wi-Fi, switching from 5G Wi-Fi to 2.4G Wi-Fi. The twelfth threshold includes the tenth threshold or the eleventh threshold, and that the signal status parameter of the cellular network is less than a twelfth threshold includes: The received signal strength parameter of the cellular network is less than the tenth threshold, or the signal quality parameter of the cellular network is less than the eleventh threshold.

In another possible design, when the instructions are executed by the one or more processors, the wireless access device is further enabled to perform the following step: if it is determined that there is a Wi-Fi device whose signal status parameter is less than the first threshold and there is a device using 2.4G Wi-Fi in the connected Wi-Fi devices, the frequency band used by the cellular network has interference to 2.4G Wi-Fi, and all the connected Wi-Fi devices support 5G Wi-Fi, switching from 2.4G Wi-Fi to 5G Wi-Fi; or if it is determined that there is a Wi-Fi device whose signal status parameter is less than the first threshold and there is a device using 5G Wi-Fi in the connected Wi-Fi devices, the frequency band used by the cellular network has interference to 5G Wi-Fi, and all the connected Wi-Fi devices support 2.4G Wi-Fi, switching from 5G Wi-Fi to 2.4G Wi-Fi.

In another possible design, the second preset condition further includes: There is a Wi-Fi device whose signal status parameter is less than the first threshold and there is a device using 2.4G Wi-Fi in the connected Wi-Fi devices, and the frequency band used by the cellular network has interference to 2.4G Wi-Fi. Alternatively, the second preset condition further includes: There is a Wi-Fi device whose signal status parameter is less than the first threshold and there is a device using 5G Wi-Fi in the connected Wi-Fi devices, and the frequency band used by the cellular network has interference to 5G Wi-Fi.

In another possible design, when the instructions are executed by the one or more processors, the wireless access device is further enabled to perform the following step: if no Wi-Fi device is connected, or if there is no Wi-Fi device whose signal status parameter is less than the first threshold in the connected Wi-Fi devices, or if 2.4G Wi-Fi is used but 5G Wi-Fi is not used, and the frequency band used by the cellular network has no interference to 2.4G Wi-Fi, or if 5G Wi-Fi is used but 2.4G Wi-Fi is not used, and the frequency band used by the cellular network has no interference to 5G Wi-Fi, or if the received signal strength parameter of the cellular network is less than the tenth threshold or the signal quality parameter of the cellular network is less than the eleventh threshold, and the Wi-Fi rate of the Wi-Fi device with the smallest signal status parameter is greater than or equal to a thirteenth threshold, or if the received signal strength parameter of the cellular network is less than the tenth threshold or the signal quality parameter of the cellular network is less than the eleventh threshold, and the air interface throughput of the cellular network is less than a fourteenth threshold, stopping reducing the uplink transmit power of the cellular network.

In another possible design, when the instructions are executed by the one or more processors, the wireless access device is further enabled to perform the following step: if it is determined that there is a Wi-Fi device whose signal status parameter is less than the first threshold and there is a device using 2.4G Wi-Fi in the connected Wi-Fi devices, the frequency band used by the cellular network has interference to 2.4G Wi-Fi, the Wi-Fi rate of the Wi-Fi device with the smallest signal status parameter is less than the fourth threshold, the air interface throughput of the cellular network is less than the fourteenth threshold, the frequency band used by the cellular network has no interference to 5G Wi-Fi, and all the connected Wi-Fi devices support 5G Wi-Fi, switching from 2.4G Wi-Fi to 5G Wi-Fi; or if it is determined that there is a Wi-Fi device whose signal status parameter is less than the first threshold and there is a device using 5G Wi-Fi in the connected Wi-Fi devices, the frequency band used by the cellular network has interference to 5G Wi-Fi, the Wi-Fi rate of the Wi-Fi device with the smallest signal status parameter is less than the fourth threshold, the air interface throughput of the cellular network is less than the fourteenth threshold, the frequency band used by the cellular network has no interference to 2.4G Wi-Fi, and all the connected Wi-Fi devices support 2.4G Wi-Fi, switching from 5G Wi-Fi to 2.4G Wi-Fi.

According to another aspect, an embodiment of this application provides an interference processing method, applied to a wireless access device. The method includes: The wireless access device accesses the Internet and receives a cellular signal. The wireless access device sends a Wi-Fi signal. The wireless access device converts a cellular signal received by a cellular module into the Wi-Fi signal. If it is determined that a first preset condition or a second preset condition or both are met, the wireless access device reduces uplink transmit power of a cellular network, to reduce interference from the cellular signal to the Wi-Fi signal. The first preset condition includes: There is a Wi-Fi device whose signal status parameter is less than a first threshold in connected Wi-Fi devices, the uplink transmit power of the cellular network is greater than or equal to a second threshold, and a signal status parameter of the cellular network is greater than or equal to a third threshold, where the signal status parameter includes a received signal strength parameter and a signal quality parameter. The second preset condition includes: A Wi-Fi rate of a Wi-Fi device with a smallest signal status parameter in the connected Wi-Fi devices is less than a fourth threshold, and an air interface throughput of the cellular network is greater than or equal to a fifth threshold.

In a possible design, the first threshold includes a sixth threshold or a seventh threshold, and the Wi-Fi device whose signal status parameter is less than the first threshold is a Wi-Fi device whose received signal strength parameter is less than the sixth threshold or whose signal quality parameter is less than the seventh threshold. The Wi-Fi device with the smallest signal status parameter is a Wi-Fi device with a smallest received signal strength parameter or a smallest signal quality parameter. The third threshold includes an eighth threshold and a ninth threshold, and that a signal status parameter of the cellular network is greater than or equal to a third threshold includes: The received signal strength parameter of the cellular network is greater than or equal to the eighth threshold, and the signal quality parameter of the cellular network is greater than or equal to the ninth threshold.

In another possible design, the first preset condition further includes: There is a Wi-Fi device using 2.4G Wi-Fi, and a frequency band used by the cellular network has full-band interference to 2.4G Wi-Fi. Alternatively, the first preset condition further includes: There is a Wi-Fi device using 5G Wi-Fi, and a frequency band used by the cellular network has interference to 5G Wi-Fi.

In another possible design, the method further includes: If no Wi-Fi device is connected, or if there is no Wi-Fi device whose signal status parameter is less than the first threshold in the connected Wi-Fi devices, or if 2.4G Wi-Fi is used but 5G Wi-Fi is not used, and the frequency band used by the cellular network has no interference to 2.4G Wi-Fi, or if 5G Wi-Fi is used but 2.4G Wi-Fi is not used, and the frequency band used by the cellular network has no interference to 5G Wi-Fi, or if the received signal strength parameter of the cellular network is less than a tenth threshold, or if the signal quality parameter of the cellular network is less than an eleventh threshold, the wireless access device stops reducing the uplink transmit power of the cellular network.

In another possible design, the method further includes: If the wireless access device determines that there is a Wi-Fi device whose signal status parameter is less than the first threshold and there is a device using 2.4G Wi-Fi in the connected Wi-Fi devices, the frequency band used by the cellular network has full-band interference to 2.4G Wi-Fi, the uplink transmit power of the cellular network is greater than or equal to the second threshold, the signal status parameter of the cellular network is less than a twelfth threshold, the frequency band used by the cellular network has no interference to 5G Wi-Fi, and all the connected Wi-Fi devices support 5G Wi-Fi, the wireless access device switches from 2.4G Wi-Fi to 5G Wi-Fi. Alternatively, if the wireless access device determines there is a Wi-Fi device whose signal status parameter is less than the first threshold and there is a device using 5G Wi-Fi in the connected Wi-Fi devices, the frequency band used by the cellular network has interference to 5G Wi-Fi, the uplink transmit power of the cellular network is greater than or equal to the second threshold, the signal status parameter of the cellular network is less than a twelfth threshold, the frequency band used by the cellular network has no interference to 2.4G Wi-Fi, and all the connected Wi-Fi devices support 2.4G Wi-Fi, the wireless access device switches from 5G Wi-Fi to 2.4G Wi-Fi. The twelfth threshold includes the tenth threshold or the eleventh threshold, and that the signal status parameter of the cellular network is less than a twelfth threshold includes: The received signal strength parameter of the cellular network is less than the tenth threshold, or the signal quality parameter of the cellular network is less than the eleventh threshold.

In another possible design, the method further includes: If the wireless access device determines that there is a Wi-Fi device whose signal status parameter is less than the first threshold and there is a device using 2.4G Wi-Fi in the connected Wi-Fi devices, the frequency band used by the cellular network has interference to 2.4G Wi-Fi, and all the connected Wi-Fi devices support 5G Wi-Fi, the wireless access device switches from 2.4G Wi-Fi to 5G Wi-Fi. Alternatively, if the wireless access device determines that there is a Wi-Fi device whose signal status parameter is less than the first threshold and there is a device using 5G Wi-Fi in the connected Wi-Fi devices, the frequency band used by the cellular network has interference to 5G Wi-Fi, and all the connected Wi-Fi devices support 2.4G Wi-Fi, the wireless access device switches from 5G Wi-Fi to 2.4G Wi-Fi.

In another possible design, the method further includes: the second preset condition further includes: There is a Wi-Fi device whose signal status parameter is less than the first threshold and there is a device using 2.4G Wi-Fi in the connected Wi-Fi devices, and the frequency band used by the cellular network has interference to 2.4G Wi-Fi. Alternatively, the second preset condition further includes: There is a Wi-Fi device whose signal status parameter is less than the first threshold and there is a device using 5G Wi-Fi in the connected Wi-Fi devices, and the frequency band used by the cellular network has interference to 5G Wi-Fi.

In another possible design, the method further includes: If no Wi-Fi device is connected, or if there is no Wi-Fi device whose signal status parameter is less than the first threshold in the connected Wi-Fi devices, or if 2.4G Wi-Fi is used but 5G Wi-Fi is not used, and the frequency band used by the cellular network has no interference to 2.4G Wi-Fi, or if 5G Wi-Fi is used but 2.4G Wi-Fi is not used, and the frequency band used by the cellular network has no interference to 5G Wi-Fi, or if the received signal strength parameter of the cellular network is less than the tenth threshold or the signal quality parameter of the cellular network is less than the eleventh threshold, and the Wi-Fi rate of the Wi-Fi device with the smallest signal status parameter is greater than or equal to a thirteenth threshold, or if the received signal strength parameter of the cellular network is less than the tenth threshold or the signal quality parameter of the cellular network is less than the eleventh threshold, and the air interface throughput of the cellular network is less than a fourteenth threshold, the wireless access device stops reducing the uplink transmit power of the cellular network.

In another possible design, the method further includes: If the wireless access device determines that there is a Wi-Fi device whose signal status parameter is less than the first threshold and there is a device using 2.4G Wi-Fi in the connected Wi-Fi devices, the frequency band used by the cellular network has interference to 2.4G Wi-Fi, the Wi-Fi rate of the Wi-Fi device with the smallest signal status parameter is less than the fourth threshold, the air interface throughput of the cellular network is less than the fourteenth threshold, the frequency band used by the cellular network has no interference to 5G Wi-Fi, and all the connected Wi-Fi devices support 5G Wi-Fi, the wireless access device switches from 2.4G Wi-Fi to 5G Wi-Fi. Alternatively, if the wireless access device determines that there is a Wi-Fi device whose signal status parameter is less than the first threshold and there is a device using 5G Wi-Fi in the connected Wi-Fi devices, the frequency band used by the cellular network has interference to 5G Wi-Fi, the Wi-Fi rate of the Wi-Fi device with the smallest signal status parameter is less than the fourth threshold, the air interface throughput of the cellular network is less than the fourteenth threshold, the frequency band used by the cellular network has no interference to 2.4G Wi-Fi, and all the connected Wi-Fi devices support 2.4G Wi-Fi, the wireless access device switches from 5G Wi-Fi to 2.4G Wi-Fi.

According to another aspect, an embodiment of this application provides an interference processing apparatus. The apparatus is included in a wireless access device, and the apparatus has a function of implementing behavior of the wireless access device in any one of the foregoing aspects and possible implementations. The function may be implemented by hardware, or may be implemented by hardware executing corresponding software. The hardware or the software includes one or more modules or units corresponding to the foregoing function, for example, a receiving module or unit, a conversion module or unit, a sending module or unit, or a processing module or unit.

According to another aspect, an embodiment of this application provides a chip, including a processor and a data interface. The data interface is configured to obtain a cellular signal from a cellular module. The processor is configured to demodulate the cellular signal, and modulate a demodulated signal. The data interface is further configured to transmit a modulated signal to a Wi-Fi module. The processor is further configured to: if it is determined that a first preset condition or a second preset condition or both are met, reduce uplink transmit power of a cellular network, to reduce interference from the cellular signal to a Wi-Fi signal. The first preset condition includes: There is a Wi-Fi device whose signal status parameter is less than a first threshold in connected Wi-Fi devices, the uplink transmit power of the cellular network is greater than or equal to a second threshold, and a signal status parameter of the cellular network is greater than or equal to a third threshold, where the signal status parameter includes a received signal strength parameter and a signal quality parameter. The second preset condition includes: A Wi-Fi rate of a Wi-Fi device with a smallest signal status parameter in the connected Wi-Fi devices is less than a fourth threshold, and an air interface throughput of the cellular network is greater than or equal to a fifth threshold. The chip may be configured to perform the interference processing method performed by the wireless access device in any one of the foregoing aspects and possible designs.

According to another aspect, an embodiment of this application provides a computer storage medium, including computer instructions. When the computer instructions are run on a computer, the computer is enabled to perform the interference processing method performed by the wireless access device in any one of the foregoing aspects and possible designs.

According to another aspect, an embodiment of this application provides a computer program product. When the computer program product runs on a computer, the computer is enabled to perform the interference processing method performed by the wireless access device in any one of the foregoing aspects and possible designs.

DESCRIPTION OF EMBODIMENTS

Figure 1:
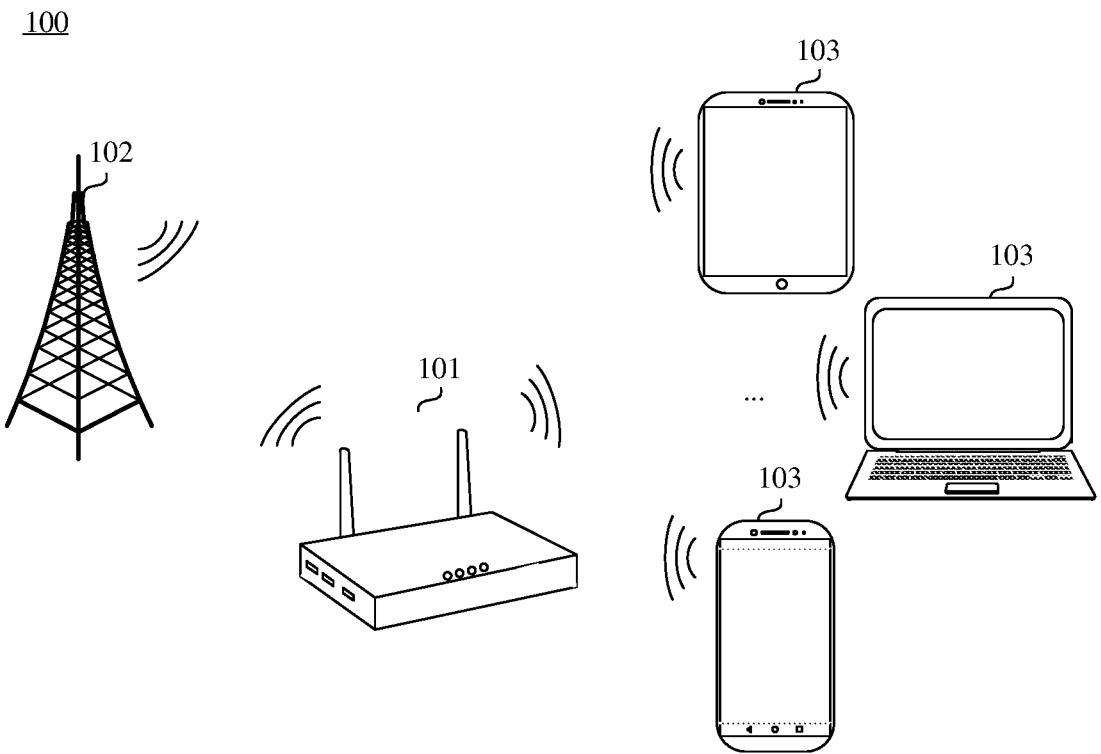
FIG. 1 is a schematic diagram of a communications system according to an embodiment of this application.

The following describes the technical solutions in the embodiments of this application with reference to the accompanying drawings in the embodiments of this application. In descriptions of the embodiments of this application, "I" means "or" unless otherwise specified. For example, A/B may represent A or B. In this specification, "and/or" describes only an association for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

An existing method in which a wireless router performs interference processing by switching a Wi-Fi channel cannot be used in some cases. For example, when all 2.4G Wi-Fi or 5G Wi-Fi frequency bands are interfered by a cellular network, the wireless router cannot perform interference processing by switching a Wi-Fi channel.

For example, as shown in Table 1, all 2.4G Wi-Fi frequency bands are from 2400 MHz to 2500 MHz, all 5G Wi-Fi frequency bands are from 4900 MHz to 5900 MHz, a cellular B40 frequency band is from 2300 MHz to 2400 MHz, a cellular B41 frequency band is from 2496 MHz to 2690 MHz, a cellular N41 frequency band is from 2496 MHz to 2690 MHz, and a cellular N79 frequency band is 4400 MHz to 5000 MHz.

A cell bandwidth of a single cell on the cellular B40 and B41 is less than or equal to 20 MHz. Because the cellular B40 is relatively close to a frequency in 2.4G Wi-Fi channels 1 to 3, when the wireless router uses the cellular B40, the cell bandwidth on the cellular B40 easily causes interference to the 2.4G Wi-Fi channels 1 to 3. Because the cellular B41 is relatively close to a frequency in 2.4G Wi-Fi channels 11 to 13, when the wireless router uses the cellular B41, the cell bandwidth easily causes interference to the 2.4G Wi-Fi channels 11 to 13. In other words, the cellular B40 and B41 easily cause interference to some 2.4G Wi-Fi frequency bands.

In addition, a wider cellular uplink bandwidth indicates a larger frequency range of interference, such as spurious interference and co-channel interference, caused by the cellular network to Wi-Fi. A cell bandwidth of a single cell in cellular N41 and N79 may reach a wider bandwidth, for example, 40 MHz, 80 MHz, or 100 MHz. Because the cellular N41 is relatively close to the 2.4G Wi-Fi frequency bands, when the wireless router uses the cellular N41, the cell bandwidth in the cellular N41 easily causes full-band interference to 2.4G Wi-Fi. Because the cellular N79 is relatively close to the 5G Wi-Fi frequency bands, when the wireless router uses the cellular N79, the cell bandwidth in the cellular N79 easily causes full-band interference to 5G Wi-Fi. In other words, the cellular N41 easily causes full-band interference to 2.4G Wi-Fi, and the cellular N79 easily causes full-band interference to 5G Wi-Fi.

TABLE 1

| Cellular | Uplink frequency band | Wi-Fi | Frequency band |
|---|---|---|---|
| N41 | 2496 MHz to 2690 MHz | 2.4G Wi-Fi | 2400 MHz to 2500 MHz |
| B40 | 2300 MHz to 2400 MHz | 2.4G Wi-Fi channels 1 to 3 | 2401 MHz to 2433 MHz |
| B41 | 2496 MHz to 2690 MHz | 2.4G Wi-Fi channels 11 to 13 | 2451 MHz to 2483 MHz |
| N79 | 4400 MHz to 5000 MHz | 5G Wi-Fi | 4900 MHz to 5900 MHz |
| ... | ... | ... | ... |

When the cellular network causes interference to some 2.4G Wi-Fi frequency bands, the wireless router may switch a Wi-Fi channel to avoid or reduce interference from the cellular network to 2.4G Wi-Fi. When the cellular network causes full-band interference to Wi-Fi, the wireless router cannot switch a channel to avoid or reduce interference from the cellular network to Wi-Fi, and even cannot use Wi-Fi normally.

The embodiments of this application provide an interference processing method. The method may be applied to a communications system 100 shown in FIG. 1. The system 100 may include a wireless access device (which may be, for example, a wireless router, a mobile hotspot, or a wireless access point) 101, a first wireless device 102, and a second wireless device 103. The wireless access device 101 may convert a wireless signal based on a first wireless technology into a wireless signal based on a second wireless technology, and forward the wireless signal, so that a user can perform wireless communication by using the wireless signal based on the second wireless technology. In other words, the wireless access device 101 may convert a first wireless network into a second wireless network, so that the user can access the second wireless network for communication.

In the communications system 100, wireless communication between the wireless access device 101 and the first wireless device 102 may be performed based on the first wireless technology, and wireless communication between the wireless access device 101 and the second wireless device 103 may be performed based on the second wireless technology.

For example, the wireless access device may be customer-premises equipment (CPE), a wireless modem E5, or the like. The wireless access device may alternatively be another electronic device that has conversion and access functions based on the wireless technology provided in the embodiments of this application, for example, a mobile phone, a tablet computer, a notebook computer, an ultra-mobile personal computer (UMPC), a personal digital assistant (PDA), a smartwatch, or an augmented reality (AR)/virtual reality (VR) device.

The first wireless technology and the second wireless technology may be different wireless technologies in cellular mobile communications such as 2G, 3G, 4G, or 5G, Bluetooth (BT), a wireless local area network (WLAN) (for example, Wi-Fi), ZigBee, frequency modulation (FM), a near field communication (NFC) technology, an infrared (IR) technology, a universal 2.4G/5G frequency band wireless communications technology, or the like. For example, the first wireless technology may be a cellular mobile communications technology, and the second wireless technology may be a Wi-Fi wireless communications technology.

It may be understood that the first wireless technology and the second wireless technology may alternatively be other wireless technologies that are not listed in this embodiment of this application. A specific type of the wireless technology is not limited in embodiments of this application.

In the interference processing method provided in this embodiment of this application, the wireless access device may reduce transmit power of the first wireless technology, to reduce interference, such as spurious interference and co-channel interference, from the first wireless technology to the second wireless technology, so that the user can use the wireless access device to normally perform wireless communication by using the second wireless technology. Particularly, when the first wireless technology causes full-band interference to the second wireless technology, and the wireless access device cannot avoid or reduce the interference by switching a channel, the transmit power of the first wireless technology may be reduced, to reduce the interference from the first wireless technology to the second wireless technology.

Figure 2:
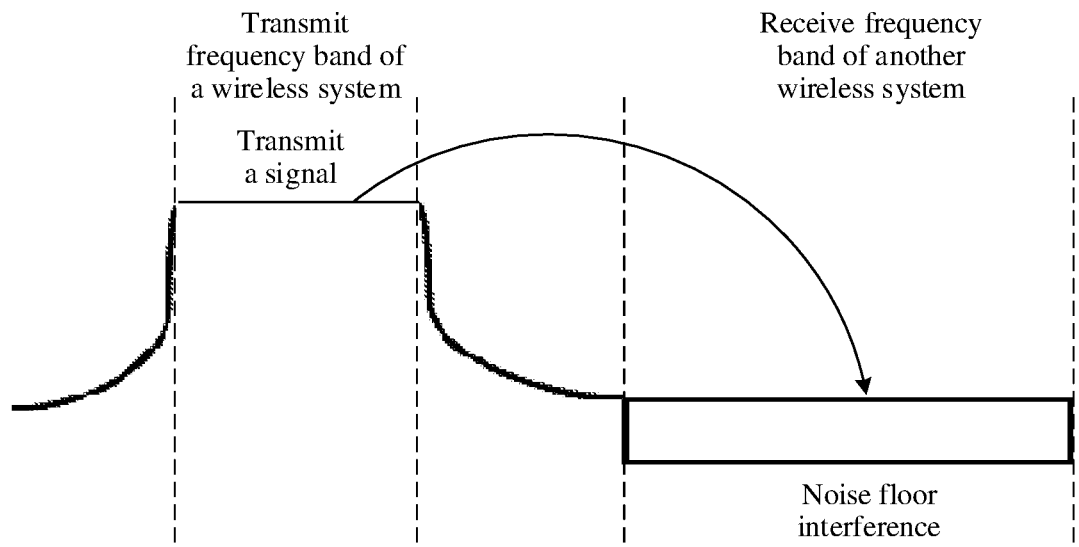
FIG. 2 is a schematic diagram of interference according to an embodiment of this application.

As shown in FIG. 2, the spurious interference refers to interference caused by spurious emission outside a frequency band of a wireless system falling into a receive frequency band of another wireless system. For the wireless access device, spurious emission outside a frequency band using the first wireless technology falls into a frequency band using the second wireless technology, causing spurious interference to the second wireless technology. In addition, higher transmit power used in the first wireless technology indicates higher power of spurious emission falling into the frequency band using the second wireless technology (namely, power of receiving noise floor in the frequency band using the second wireless technology), and therefore greater spurious interference to the second wireless technology. Similarly, for the co-channel interference, higher transmit power used in the first wireless technology indicates greater co-channel interference to the second wireless technology. Therefore, the transmit power used in the first wireless technology may be reduced, to reduce interference from the first wireless technology to the second wireless technology.

Figure 3A:
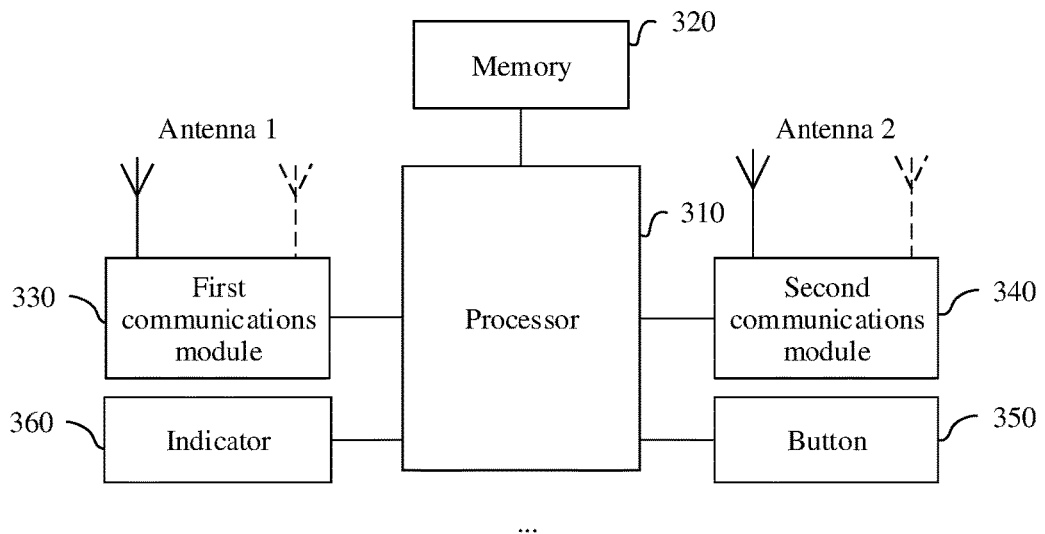
FIG. 3A is a schematic diagram of a structure of a wireless access device according to an embodiment of this application.

For example, FIG. 3A is a schematic diagram of a structure of a wireless access device 300. The wireless access device 300 may include a processor 310, a memory 320, a first communications module 330 configured to provide a first wireless technology, a second communications module 340 configured to provide a second wireless technology, an antenna 1, an antenna 2, and the like.

It may be understood that the components shown in the figure may be implemented by hardware, software, or a combination of software and hardware. The structure shown in this embodiment of this application does not constitute a specific limitation on the wireless access device 300.

In some other embodiments of this application, the wireless access device 300 may include more or fewer components than those shown in the figure, or some components may be combined, or some components may be split, or different component arrangements may be used. For example, the wireless access device may further include a button 350, an indicator 360, and components such as a speaker, a display, a microphone, or a sensor.

The processor 310 may include one or more processing units. For example, the processor 310 may include a modem processor, a controller, a memory, a baseband processor, and the like. Different processing units may be independent components, or may be integrated into one or more processors.

The controller may be a nerve center and a command center of the wireless access device 300. The controller may generate an operation control signal based on instruction operation code and a time sequence signal, to complete control of instruction fetching and instruction execution.

In some embodiments, the controller may determine, based on related parameters reported by the first communications module 330 and the second communications module 340, whether the first wireless technology causes interference to the second wireless technology and an interference magnitude. When determining that the first wireless technology causes severe interference to the second wireless technology, the controller may indicate the first communications module 330 to reduce uplink transmit power, or indicate the second communications module 340 to switch a wireless communications channel, or indicate the second communications module 340 to switch a wireless communications frequency band, to reduce interference from the first wireless technology to the second wireless technology.

For example, the first communications module 330 is a mobile communications module, and the second communications module 340 is a Wi-Fi module. In this case, the controller may indicate the mobile communications module to reduce uplink transmit power, or indicate the Wi-Fi module to switch a 2.4G Wi-Fi channel, or indicate the Wi-Fi module to switch a frequency band between 2.4G Wi-Fi and 5G Wi-Fi, to reduce interference from the cellular network to Wi-Fi.

A memory 320 may further be disposed in the processor 310, and is configured to store instructions and data. In some embodiments, the memory 320 in the processor 310 is a cache. The memory 320 may store instructions or data that is just used or cyclically used by the processor 310. If the processor 310 needs to use the instructions or the data again, the processor 310 may directly invoke the instructions or the data from the memory 320. This avoids repeated access and reduces a waiting time of the processor 310, thereby improving system efficiency.

In some embodiments, the processor 310 may include one or more interfaces. The interfaces may include an inter-integrated circuit (I2C) interface, a universal asynchronous receiver/transmitter (UART) interface, a general-purpose input/output (GPIO) interface, and/or the like.

The I2C interface is a two-way synchronization serial bus, and includes one serial data line (SDA) and one serial clock line (SCL). In some embodiments, the processor 310 may include a plurality of groups of I2C buses. The processor 310 may be separately coupled to a touch sensor, a charger, an indicator, and the like through different I2C bus interfaces. For example, the processor 310 may be coupled to the touch sensor through the I2C interface, so that the processor 310 communicates with the touch sensor through the I2C bus interface, to implement a touch function of the wireless access device 300.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 310 to a wireless communications module. For example, the processor 310 communicates with a Bluetooth module in the wireless communications module through the UART interface, to implement a Bluetooth function. In some embodiments, an audio module may transmit an audio signal to the wireless communications module through the UART interface, to implement a function of playing music by using a Bluetooth headset.

The GPIO interface may be configured through software. The GPIO interface may be configured as a control signal, or may be configured as a data signal. In some embodiments, the GPIO interface may be configured to connect the processor 310 to the wireless communications module, a sensor module, or the like. The GPIO interface may alternatively be configured as an I2C interface, an I2S interface, a UART interface, a MIPI interface, or the like.

It may be understood that an interface connection relationship between the modules illustrated in the embodiments of this application is merely an example for description, and does not constitute a limitation on the structure of the wireless access device 300. In some other embodiments of this application, the wireless access device 300 may alternatively use an interface connection manner different from that in the foregoing embodiment, or use a combination of a plurality of interface connection manners.

The memory 320 may be configured to store computer-executable program code, and the executable program code includes instructions. The processor 310 runs the instructions stored in the memory 320, to perform various function applications of the wireless access device 300 and process data. The memory 320 may include a program storage area and a data storage area. The program storage area may store an operating system, an application required by at least one function, and the like. The data storage area may store data created in a process of using the wireless access device, and the like. In addition, the memory 320 may include a high-speed random access memory, and may further include a nonvolatile memory such as at least one magnetic disk storage device, a flash storage device, or a universal flash storage (UFS).

The first communications module 330 may receive wireless data information based on the first wireless technology, obtain related parameters of the first wireless technology, such as a bandwidth, signal quality, signal strength, and a rate, and report the parameters to the controller, so that the controller determines whether the first wireless technology causes severe interference to the second wireless technology. For example, the first communications module 330 may be a mobile communications module, and the mobile communications module may provide a solution that is applied to the wireless access device 300 and that includes cellular communications such as 2G, 3G, 4G, or 5G. The mobile communication module may include at least one filter, a switch, a power amplifier, a low noise amplifier (LNA), and the like. The mobile communications module may receive an electromagnetic wave through the antenna 1, perform processing such as filtering or amplification on the received electromagnetic wave, and transmit the electromagnetic wave to the modem processor for demodulation. The mobile communications module may further amplify a signal modulated by the modem processor, and convert the signal into an electromagnetic wave for radiation through the antenna 1. In some embodiments, at least some function modules in the mobile communications module may be disposed in the processor 310. In some embodiments, at least some function modules in the mobile communications module may be disposed in a same device as at least some modules in the processor 310.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. In some embodiments, the modem processor may be an independent component. In some other embodiments, the modem processor may be independent of the processor 310, and is disposed in a same component as the mobile communications module or another function module.

In some embodiments, the antenna 1 of the wireless access device 300 is coupled to the mobile communications module, and the antenna 2 is coupled to the wireless communications module, so that the wireless access device 300 may communicate with a network and another device by using a mobile communications technology. The mobile communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/ or a satellite-based augmentation system (SBAS).

The second communications module 340 may forward, by using the second wireless technology, the wireless data information received by the first communications module 330; obtain related parameters of the second wireless technology, such as a bandwidth, signal quality, signal strength, and a rate; and report the parameters to the controller, so that the controller determines whether the first wireless technology causes severe interference to the second wireless technology. For example, the second communications module 340 may provide a solution that is applied to the wireless access device 300 and that includes a wireless communications technology, for example, a wireless local area network (for example, Wi-Fi), Bluetooth, a global navigation satellite system, frequency modulation, a near field communication technology, an infrared technology, or a universal 2.4G/5G frequency band wireless communications technology. The second communications module 340 may be one or more components integrating at least one communications processing module. The second communications module 340 receives an electromagnetic wave through the antenna 2, performs frequency modulation and filtering processing on an electromagnetic wave signal, and sends a processed signal to the processor 310. The second communications module 340 may further receive a to-be-sent signal from the processor 310, perform frequency modulation and amplification on the signal, and convert the processed signal into an electromagnetic wave for radiation through the antenna 2. For example, the second communications module 340 may be a Wi-Fi module.

In this embodiment, the first communications module 330 may obtain the related parameters of the first wireless technology, and report the parameters to the controller. The second communications module 340 may obtain the related parameters of the second wireless technology, and report the parameters to the controller. When determining, based on the related parameters reported by the first communications module 330 and the second communications module 340, whether the first wireless technology causes severe interference to the second wireless technology, the controller may indicate the first communications module 330 to reduce the uplink transmit power, or indicate the second communications module 340 to switch the wireless communications channel, or indicate the second communications module 340 to switch the wireless communications frequency band, to reduce the interference from the first wireless technology to the second wireless technology.

Figure 3B:
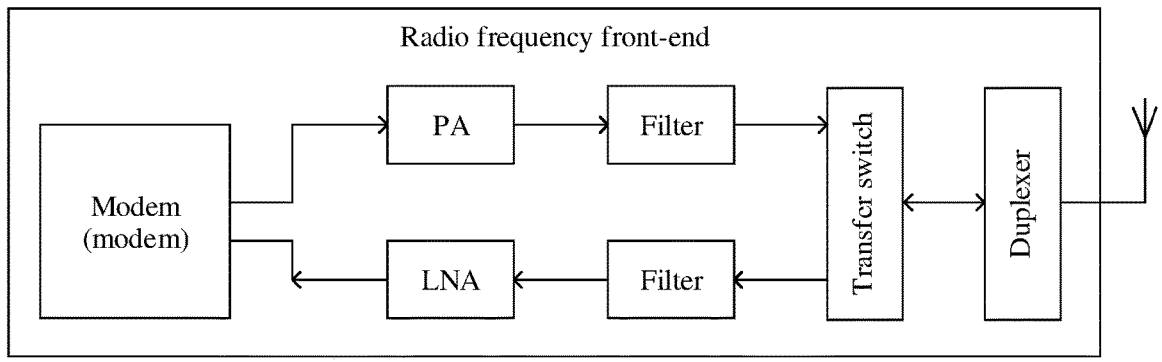
FIG. 3B is a schematic diagram of a structure of a radio frequency front-end according to an embodiment of this application.

For example, when the first wireless technology is a cellular technology, as shown in FIG. 3B, the wireless access device may reduce an amplification factor in a power amplifier (PA) of a radio frequency front-end in the first communications module, to reduce uplink transmit power of a cellular network. For a cellular uplink signal, after passing through a modem, a PA, a filter, a transfer switch, and a duplexer in the radio frequency front-end, the cellular signal is transmitted through an antenna. For a cellular downlink signal, after being received through an antenna, the cellular signal passes through the duplexer, the transfer switch, a filter, and an LNA in the radio frequency front-end, and then reaches the modem for demodulation.

Figure 3C:
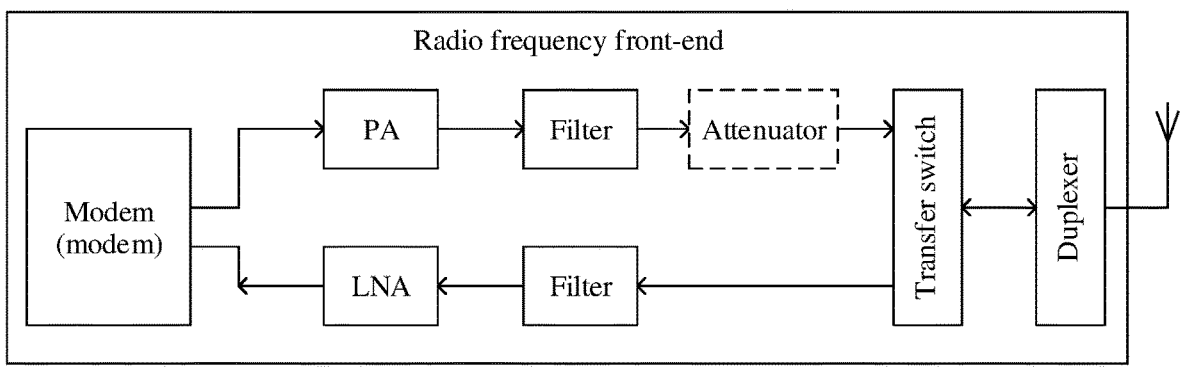
FIG. 3C is a schematic diagram of a structure of another radio frequency front-end according to an embodiment of this application.

For another example, when the first wireless technology is a cellular technology, as shown in FIG. 3C, the wireless access device may reduce an amplitude of an uplink transmit signal of a cellular network by adding an attenuator to a radio frequency front-end, thereby reducing uplink transmit power of the cellular network.

In this embodiment, the first communications module 330 receives a wireless signal based on the first wireless technology, performs processing such as filtering and amplification on the wireless signal, and sends the processed signal to the modem processor for demodulation, to obtain a demodulated digital signal. The modem processor modulates the digital signal based on the second wireless technology, and the second communications module 340 performs frequency modulation on the modulated signal, amplifies the modulated signal, and sends the modulated signal through an antenna.

From a perspective of a software system, the wireless access device 300 may include a modem subsystem cooperating with the first communications module 330, and a wireless access subsystem cooperating with the second communications module 340. After the first communications module 330 receives the wireless signal based on the first wireless technology, the modem subsystem may demodulate the wireless signal, to obtain the digital signal and store the digital signal. Then, the modem subsystem notifies the wireless access subsystem. After receiving the notification from the modem subsystem, the wireless access subsystem reads the stored digital signal, and modulates the digital signal based on the second wireless technology. The second communications module 340 performs frequency modulation on the modulated signal and sends the modulated signal in a form of a wireless signal, so that a user can use the signal.

The following provides descriptions by using an example in which the first wireless technology is a cellular wireless communications technology, the second wireless technology is a Wi-Fi wireless communications technology, and the wireless access device accesses the Internet and receives a cellular signal through the cellular network, and converts the cellular signal into a Wi-Fi signal, so that the user can use a Wi-Fi device to access a Wi-Fi network.

In this embodiment, the wireless access device may determine, based on one or a combination of a frequency band, signal strength, signal quality, a rate, and the like that are separately used by the cellular network and Wi-Fi, a magnitude of the interference from the cellular network to Wi-Fi and impact of the interference on user experience. Further, the wireless access device may determine whether to perform interference processing, an implementation used for interference processing, and the like, to reduce the interference from the cellular network to Wi-Fi, and improve user experience.

For example, the wireless access device may specifically determine, based on conditions in Table 2, whether to perform interference processing.

TABLE 2

| Condition number | Condition description |
| --- | --- |
| Condition 1 | 2.4G Wi-Fi is currently used |
| Condition 2 | 5G Wi-Fi is currently used |
| Condition 3 | A Wi-Fi device is currently connected (that is, a parameter Wi-Fi Client > 0) |
| Condition 4 | No Wi-Fi device is currently connected (that is, a parameter Wi-Fi Client = 0) |
| Condition 5 | There is a weak-field device in currently connected Wi-Fi devices |
| Condition 6 | A rate of a non-weak-field device in currently connected Wi-Fi devices is greater than or equal to a threshold B |
| Condition 7 | A current rate of a device with a worst Wi-Fi signal status is less than a threshold C |
| Condition 8 | A current rate of a device with a worst Wi-Fi signal status is greater than or equal to a threshold D, and D is greater than or equal to C |
| Condition 9 | Frequency bands such as B40, B41, N41 that interfere with 2.4G Wi-Fi currently camp on a cellular cell |
| Condition 10 | Frequency bands such as N79 that interfere with 5G Wi-Fi currently camp on a cellular cell |
| Condition 11 | Current uplink transmit power of the cellular network is greater than or equal to a threshold H |
| Condition 12 | Current uplink transmit power of the cellular network is less than a threshold I, and I is less than or equal to H |
| Condition 13 | A current air interface throughput of the cellular network is greater than or equal to a threshold J |
| Condition 14 | A current air interface throughput of the cellular network is less than a threshold K, and K is less than or equal to J |
| Condition 15 | A current received signal strength parameter of the cellular network is greater than or equal to a threshold L |
| Condition 16 | A current received signal strength parameter of the cellular network is less than a threshold M, and M is less than or equal to L |
| Condition 17 | A signal quality parameter of a current cellular received signal is greater than or equal to a threshold N |
| Condition 18 | A signal quality parameter of a current cellular received signal is less than a threshold O, and O is less than or equal to N |
| Condition 19 | A bandwidth of a currently camped cellular cell is greater than or equal to a threshold P (where the cell has full-band interference to Wi-Fi) |
| Condition 20 | A bandwidth of a currently camped cellular cell is less than a threshold Q (where the cell has interference to some Wi-Fi frequency bands), and Q is less than or equal to P |
| Condition 21 | A received signal strength parameter of Wi-Fi is less than a threshold R |
| Condition 22 | A signal quality parameter of a Wi-Fi received signal is less than a threshold U |
| Condition 23 | All Wi-Fi devices accessing Wi-Fi support 5G Wi-Fi |
| Condition 24 | All Wi-Fi devices accessing Wi-Fi support 2.4G Wi-Fi |

For example, the wireless access device may determine, based on signal statuses of Wi-Fi and the cellular network, a degree of interference from the cellular network to Wi-Fi, and perform interference processing.

In some embodiments, when there is a Wi-Fi device whose signal status is poor, a signal status of the cellular network is good, and the uplink transmit power of the cellular network is high, the wireless access device may determine that the cellular network has severe interference to Wi-Fi. In this case, the wireless access device may reduce the uplink transmit power of the cellular network, to reduce the interference from the cellular signal to the Wi-Fi signal.

The signal status of Wi-Fi is used to indicate a status of a signal received by the Wi-Fi device. The signal status of the cellular network is used to indicate a status of the cellular signal received by the wireless access device. For example, a signal status parameter used to represent the signal status may include a received signal strength parameter and/or a signal quality parameter, or another parameter.

The received signal strength parameter may include reference signal received power (RSRP), a received signal strength indicator (RSSI), or another parameter. The signal quality parameter may include a signal to interference plus noise ratio (SINR), reference signal received quality (RSRQ), or another parameter.

In the following embodiments, an example in which the signal status parameter includes the received signal strength parameter and the signal quality parameter, the received signal strength parameter is the RSRP, and the signal quality parameter is the SINR is used for description.

When the RSRP is small, the received signal strength parameter is small, and the received signal strength is low. When the SINR is small, the signal quality parameter is small, and the signal quality is poor. When the received signal strength is low or the signal quality is poor, the signal status parameter is small, and the signal status is poor. When the received signal strength is high and the signal quality is good, the signal quality parameter is large, and the signal status is good.

If there is a Wi-Fi device in a poor signal status, Wi-Fi may be severely interfered. It can be learned from the foregoing descriptions that higher uplink transmit power of the cellular network indicates stronger interference to Wi-Fi. Therefore, when the transmit power of the cellular network is low, interference to Wi-Fi may not be mainly caused by the cellular network. If the uplink transmit power of the cellular network is high, the cellular network may cause severe interference to Wi-Fi. In this case, if the signal status of the cellular network is good, interference from the cellular network to Wi-Fi may be reduced by reducing the uplink transmit power of the cellular network.

When the signal status of the cellular received signal is also poor, a distance between the wireless access device and a cellular peer device (for example, a base station) may be long, attenuation may be large, or interference may be strong. If the wireless access device reduces the uplink transmit power to reduce the interference from the cellular network to Wi-Fi, it is likely that the cellular peer device fails to receive the cellular signal, and therefore cellular communication is interrupted. In this case, a source of the Wi-Fi signal is interrupted.

In addition, if the transmit power of the cellular network is low, and the wireless access device still reduces interference from the cellular network to Wi-Fi by reducing the uplink transmit power, the cellular signal sent by the wireless access device may fail to reach the cellular peer device, and therefore cellular communication is interrupted. In this case, the source of the Wi-Fi signal is interrupted.

A Wi-Fi device whose signal status parameter is less than a threshold 1 may be referred to as a Wi-Fi weak-field device. As shown in Table 3, when there is a Wi-Fi device whose signal status parameter is less than the threshold 1 in the connected Wi-Fi devices, it may be determined that there is a Wi-Fi device whose signal status is poor, and the condition 5 is true. A condition being true means that the condition is met. For example, the condition 5 being true means that the condition 5 is met.

When the signal status parameter includes a received signal strength parameter and a signal quality parameter, the threshold 1 may include the threshold R and/or the threshold U. When the condition 21 is true, that is, the received signal strength parameter (for example, RSRP) of Wi-Fi is less than the threshold R, or the condition 22 is true, that is, the signal quality parameter (for example, an SINR) of the Wi-Fi received signal is less than the threshold U, it may be determined that there is a Wi-Fi device whose signal status is poor. If the condition 5 is true, there is a Wi-Fi device whose signal status is poor.

When the status parameter of the cellular network is greater than or equal to a threshold 2, it may indicate that the signal status of the cellular network is good. For example, when the signal status parameter includes the received signal strength parameter and the signal quality parameter, the threshold 2 may include the threshold L and the threshold N. When the condition 15 is true, that is, the current received signal strength parameter of the cellular network is greater than or equal to the threshold L, and the condition 17 is true, that is, the signal quality parameter of the current cellular received signal is greater than or equal to the threshold N, it may indicate that the signal status of the cellular network is good.

When the condition 11 is true, that is, the current uplink transmit power of the cellular network is greater than or equal to the threshold H, it may indicate that the uplink transmit power of the cellular network is high.

Therefore, when the condition 5, the condition 11, the condition 15, and the condition 17 are true, there is a Wi-Fi device whose signal status parameter is less than the threshold 1 in the connected Wi-Fi devices, the uplink transmit power of the cellular network is greater than or equal to the threshold H, the signal status parameter of the cellular network is greater than or equal to a threshold 3. Therefore, there is a Wi-Fi device whose signal status is poor, the signal status of the cellular network is good, the uplink transmit power of the cellular network is high, and the interference from the cellular network to Wi-Fi is severe. In this case, the wireless access device may reduce the uplink transmit power of the cellular network, to reduce the interference from the cellular signal to the Wi-Fi signal.

TABLE 3

| | |
|---|---|
| There is a Wi-Fi device whose signal status parameter is less than the threshold 1 | There is a Wi-Fi device whose signal status is poor |
| The status parameter of the cellular network is greater than or equal to the threshold 2 | The signal status of the cellular network is good |
| The current uplink transmit power of the cellular network is greater than or equal to the threshold H | The uplink transmit power of the cellular network is high |
| The status parameter of the cellular network is less than the threshold 3 | The signal status of the cellular network is poor |

In some other embodiments, the wireless access device may further determine, with reference to frequency bands separately used by the cellular network and Wi-Fi, that the cellular network has interference to Wi-Fi, so as to perform interference processing. For example, when the condition 9 in Table 2 is true, the wireless access device may consider that the frequency band used by the cellular network has interference to 2.4G Wi-Fi. Alternatively, when the condition 10 is true, the wireless access device may consider that the frequency band used by the cellular network has interference to 5G Wi-Fi. In addition, if the condition 5, the condition 11, the condition 15, and the condition 17 are further met, it may indicate that the frequency band used by the cellular network has interference to Wi-Fi, there is a Wi-Fi device whose signal status is poor, the signal status of the cellular network is good, and the uplink transmit power of the cellular network is high. In this case, the wireless access device may determine that the interference from the cellular network to Wi-Fi is severe. Therefore, the wireless access device may reduce the uplink transmit power of the cellular network, to reduce the interference from the cellular signal to the Wi-Fi signal.

In some other embodiments, if there is a device using 2.4G Wi-Fi, the cellular network has full-band interference to 2.4G Wi-Fi, there is a Wi-Fi device whose signal status is poor, the transmit power of the cellular network is high, and the signal status of the cellular network is good, the wireless access device may determine that interference from the cellular network to 2.4G Wi-Fi is severe. Therefore, the wireless access device may reduce the uplink transmit power of the cellular network, to reduce the interference from the cellular network to 2.4G Wi-Fi.

For example, if the wireless access device determines that the condition 1 and the condition 3 in Table 2 are true, it may indicate that there is a device using 2.4G Wi-Fi. If the wireless access device determines that the condition 9 and the condition 19 are true, it may indicate that the cellular network has full-band interference to 2.4G Wi-Fi.

When the condition 1, the condition 3, the condition 9, the condition 19, the condition 5, the condition 11, the condition 15, and the condition 17 are true, the wireless access device may reduce the uplink transmit power of the cellular network, to reduce the interference from the cellular network to Wi-Fi.

In some other embodiments, if there is a device using 5G Wi-Fi, the cellular network has full-band interference to 5G Wi-Fi, the transmit power of the cellular network is high, there is a Wi-Fi device whose signal status is poor, and the signal status of the cellular network is good, the wireless access device may determine that interference from the cellular network to 5G Wi-Fi is severe. Therefore, the wireless access device may reduce the uplink transmit power of the cellular network, to reduce the interference from the cellular network to 5G Wi-Fi.

For example, if the wireless access device determines that the condition 2 and the condition 3 in Table 2 are true, it may indicate that there is a device using 5G Wi-Fi. If the wireless access device determines that the condition 10 and the condition 19 are true, it may indicate that the cellular network has full-band interference to 5G Wi-Fi.

When the condition 2, the condition 3, the condition 10, the condition 19, the condition 5, the condition 11, the condition 15, and the condition 17 are true, the wireless access device may reduce the uplink transmit power of the cellular network, to reduce the interference from the cellular network to Wi-Fi.

When the cellular network has interference to Wi-Fi, the wireless access device may alternatively switch a frequency band between 2.4G Wi-Fi and 5G Wi-Fi or switch a Wi-Fi channel, to reduce the interference from the cellular network to Wi-Fi.

Figure 4A:
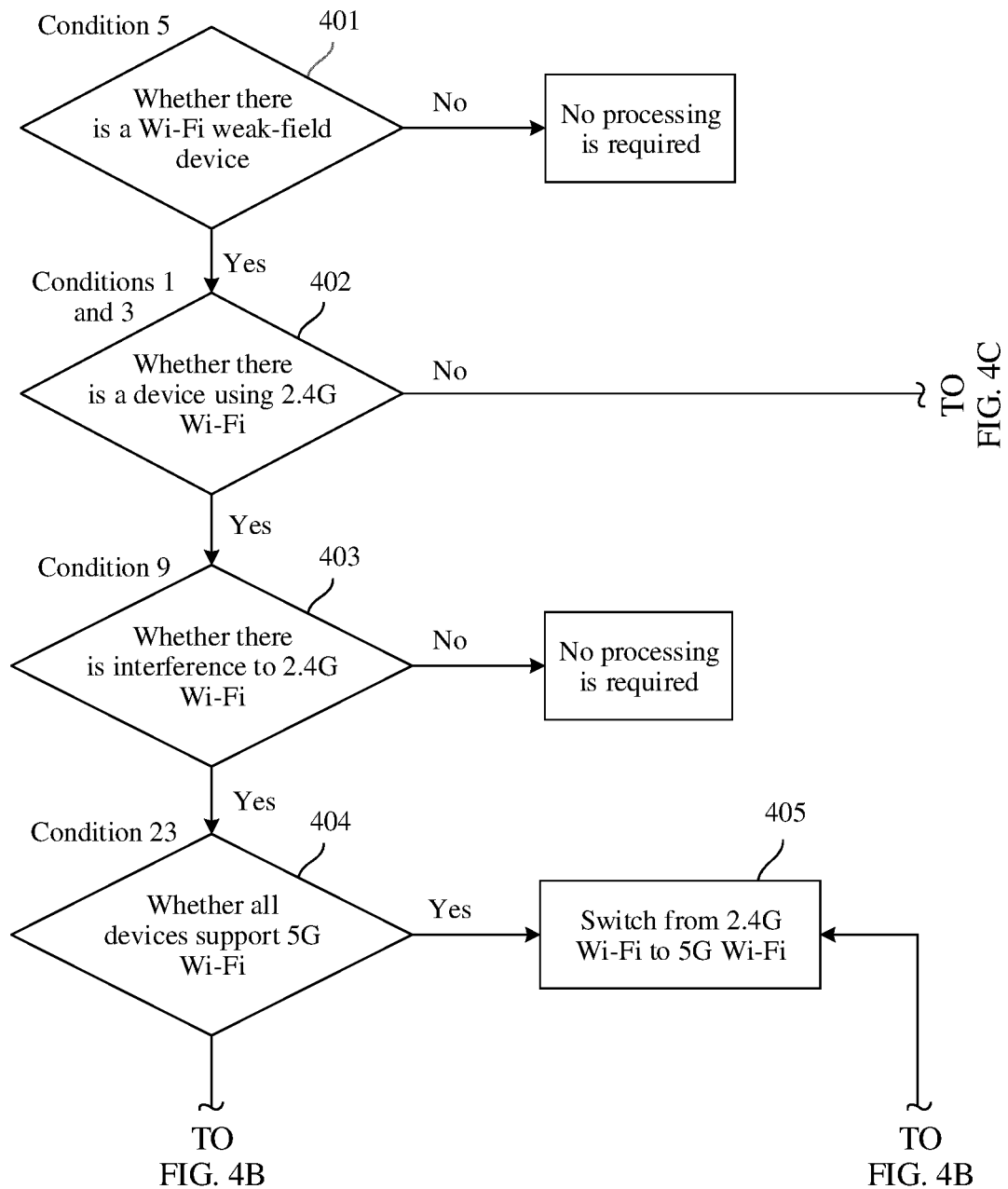
FIG. 4A to FIG. 4C are a flowchart of an interference processing method according to an embodiment of this application.
Figure 4B:
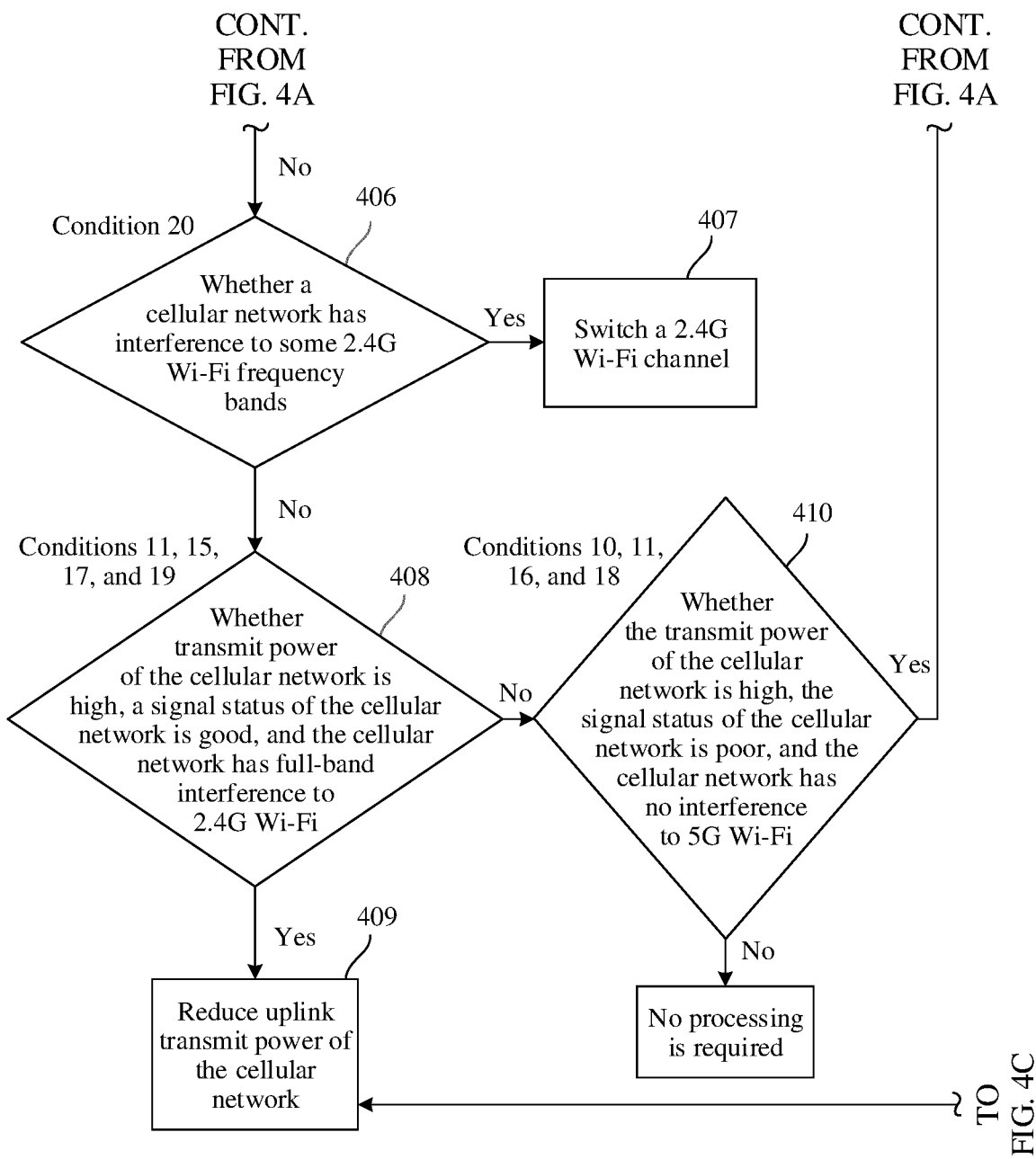
Figure 4C:
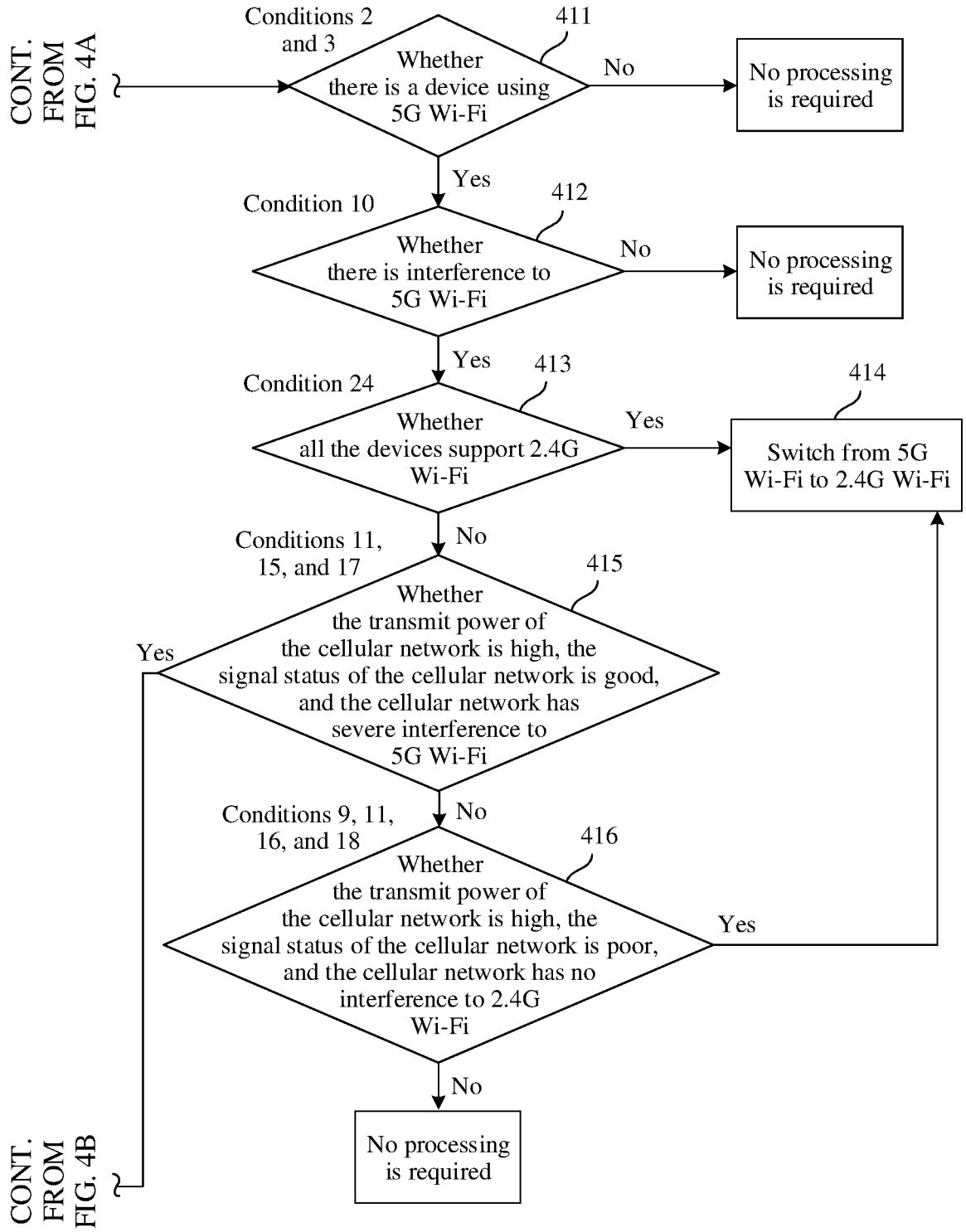

For example, FIG. 4A to FIG. 4C provide an interference processing process. The interference processing process may include the following steps.

401: The wireless access device determines whether the condition 5 is true. If yes, step 402 is performed. If no, interference processing is not performed.

When the condition 5 is true, it may indicate that there is a Wi-Fi device whose signal status parameter is less than the threshold 1, there is a Wi-Fi weak-field device whose signal status is poor, and the Wi-Fi side may be interfered with.

402: The wireless access device determines whether the condition 1 and the condition 3 are true. If yes, step 403 is performed. If no, step 411 is performed.

When the condition 1 is true, it may indicate that the wireless access device currently uses 2.4G Wi-Fi. When the condition 3 is true, it may indicate that a Wi-Fi device is currently connected. If the condition 1 and the condition 3 are true, it may indicate that there is a device using 2.4G Wi-Fi.

403: The wireless access device determines whether the condition 9 is true, that is, whether the cellular network has interference to 2.4G Wi-Fi. If yes, step 404 is performed. If no, interference processing is not performed.

404: The wireless access device determines whether the condition 23 is true, that is, whether all Wi-Fi devices currently accessing Wi-Fi support 5G Wi-Fi. If yes, step 405 is performed. If no, step 406 is performed.

When a Wi-Fi device supporting 5G Wi-Fi accesses 5G Wi-Fi, the wireless access device may record related information. The wireless access device may determine, based on related information in a historical record, whether each Wi-Fi device supports 5G Wi-Fi, so as to determine whether all Wi-Fi devices currently accessing 2.4G Wi-Fi support 5G Wi-Fi.

405: The wireless access device switches from 2.4G Wi-Fi to 5G Wi-Fi.

If the frequency band used by the cellular network has interference to 2.4G Wi-Fi, and all the connected Wi-Fi devices support 5G Wi-Fi, the wireless access device may switch from 2.4G Wi-Fi to 5G Wi-Fi, to avoid the interference from the cellular network to 2.4G Wi-Fi.

406: The wireless access device determines whether the condition 20 is true, that is, whether the cellular network has interference to some Wi-Fi frequency bands. If yes, step 407 is performed. If no, step 408 is performed.

407: The wireless access device switches a 2.4G Wi-Fi channel, to avoid or reduce the interference from the cellular network to some 2.4G Wi-Fi frequency bands.

If the frequency band used by the cellular network has interference to some Wi-Fi frequency bands, the wireless access device may switch to use a channel on which 2.4G Wi-Fi is not interfered with, to avoid or reduce the interference from the cellular network to some 2.4G Wi-Fi frequency bands. For example, if the cellular network causes interference to 2.4G Wi-Fi channels 11 to 13, the wireless access device may switch to 2.4G Wi-Fi channels 1 to 10 for use, to avoid or reduce the interference from the cellular network to some 2.4G Wi-Fi frequency bands.

408: The wireless access device determines whether the condition 19, the condition 11, the condition 15, and the condition 17 are true. If yes, step 409 is performed. If no, step 410 is performed.

If the condition 19, the condition 11, the condition 15, and the condition 17 are true, it may indicate that the signal status parameter of the cellular network is greater than or equal to the threshold 2, the uplink transmit power of the cellular network is greater than or equal to the threshold H, the signal status of the cellular network is good, the uplink transmit power of the cellular network is high, the cellular network has full-band interference to 2.4G Wi-Fi, and the interference is severe.

409: The wireless access device reduces the uplink transmit power of the cellular network, to reduce the interference from the cellular network to 2.4G Wi-Fi.

When the signal status of the cellular network is good, the uplink transmit power of the cellular network is high, the cellular network has full-band interference to 2.4G Wi-Fi, and the interference is severe, the wireless access device may reduce the uplink transmit power of the cellular network, to reduce the interference from the cellular network to 2.4G Wi-Fi.

When the uplink transmit power of the cellular network is low, and the interference from the cellular network to 2.4G Wi-Fi is not severe, or when the signal status of the cellular network is poor, the wireless access device may reduce the interference from the cellular network to 2.4G Wi-Fi without reducing the uplink transmit power of the cellular network. Otherwise, when the wireless access device reduces the transmit power, the cellular signal is likely to be interrupted.

410: The wireless access device determines whether the condition 11 is true, whether the condition 16 or the condition 18 is true, and whether the condition 10 is false. If yes, step 405 is performed. If no, interference processing is not performed.

Refer to Table 3. When the signal status parameter of the cellular network is less than or equal to the threshold 3, it may indicate that the signal status of the cellular network is poor. The threshold 3 is less than or equal to the threshold 2.

For example, when the signal status parameter includes the received signal strength parameter and the signal quality parameter, the threshold 3 may be the threshold M or the threshold O. When the condition 16 is true, that is, the current received signal strength parameter of the cellular network is less than the threshold M, it may indicate that received signal strength of the cellular network is relatively low, the signal status parameter of the cellular network is less than or equal to the threshold 3, and the signal status of the cellular network is poor. When the condition 18 is true, that is, the signal quality parameter of the current cellular received signal is less than the threshold O, it may indicate that signal quality of the cellular network is poor, the signal status parameter of the cellular network is less than the threshold 3, and the signal status of the cellular network is poor.

If the condition 11 is true, the condition 16 or the condition 18 is true, and the condition 10 is false, it may indicate that the signal status parameter of the cellular network is less than the threshold 3, the uplink transmit power of the cellular network is greater than or equal to the threshold H, and the frequency band used by the cellular network has no interference to 5G Wi-Fi. In other words, the uplink transmit power of the cellular network is high, the signal status of the cellular network is poor, and the frequency band used by the cellular network has no interference to 5G Wi-Fi. Therefore, step 405 may be performed to switch to 5G Wi-Fi for use, to avoid the interference from the cellular network to 2.4G Wi-Fi. Otherwise, the wireless access device does not perform interference processing.

411: The wireless access device determines whether the condition 2 and the condition 3 are true. If yes, step 412 is performed. If no, interference processing is not performed.

When the condition 2 is true, it may indicate that the wireless access device currently uses 5G Wi-Fi. When the condition 3 is true, it may indicate that a Wi-Fi device is currently connected. If the condition 2 and the condition 3 are true, it may indicate that there is a device using 5G Wi-Fi.

412: The wireless access device determines whether the condition 10 is true, that is, whether there is interference to 5G Wi-Fi. If yes, step 413 is performed. If no, interference processing is not performed.

If the condition 10 is false, that is, there is no interference to 5G Wi-Fi, interference processing does not need to be performed. A condition being false means that the condition is not met. For example, the condition 10 being false means that the condition 10 is not met.

413: The wireless access device determines whether the condition 24 is true, that is, whether all currently connected Wi-Fi devices support 2.4G Wi-Fi. If yes, step 414 is performed. If no, step 415 is performed.

If the condition 10 is true, that is, there is interference to 5G Wi-Fi, it may further be determined whether all Wi-Fi devices currently accessing 5G Wi-Fi support 2.4G Wi-Fi. In some embodiments, when a Wi-Fi device supporting 2.4G Wi-Fi accesses 2.4G Wi-Fi, the wireless access device may record related information. The wireless access device may determine, based on related information in a historical record, whether each Wi-Fi device supports 2.4G Wi-Fi, so as to determine whether all the Wi-Fi devices currently accessing 5G Wi-Fi support 2.4G Wi-Fi. In some other embodiments, the Wi-Fi device supports 2.4G Wi-Fi by default. Therefore, step 412 may be omitted, and step 413 may be performed after the conditions in step 411 is met.

414: The wireless access device switches from 5G Wi-Fi to 2.4G Wi-Fi.

If all the Wi-Fi devices support 2.4G Wi-Fi, the wireless access device may switch from 5G Wi-Fi with interference to 2.4G Wi-Fi without interference, to avoid interference from the cellular network to 5G Wi-Fi.

415: The wireless access device determines whether the condition 11, the condition 15, and the condition 17 are true. If yes, step 409 is performed. If no, step 416 is performed.

If the condition 11, the condition 15, and the condition 17 are true, it may indicate that the uplink transmit power of the cellular network is high, the interference from the cellular network to 5G Wi-Fi is severe, and the signal status of the cellular network is good.

When the uplink transmit power of the cellular network is low, reducing the uplink transmit power may cause cellular signal interruption. Therefore, interference to Wi-Fi cannot be reduced by reducing the uplink transmit power of the cellular network. In this case, the wireless access device may not perform interference processing.

When the signal status of the cellular network is good, the uplink transmit power of the cellular is high, and the interference from the cellular network to 5G Wi-Fi is severe, the wireless access device may reduce the uplink transmit power of the cellular network, to reduce the interference from the cellular network to 5G Wi-Fi.

416: The wireless access device determines whether the condition 11 is true, whether the condition 16 or the condition 18 is true, and whether the condition 9 is false. If yes, step 414 is performed. If no, interference processing is not performed.

The uplink transmit power of the cellular network is high but the signal status of the cellular network is poor. For example, when the condition 11 is true, the condition 16 or the condition 18 is true, and the condition 9 is false, that is, the cellular network may not cause interference to 2.4G Wi-Fi, reducing the transmit power of the cellular network may cause cellular signal interruption. Therefore, step 413 may be performed to switch from 5G Wi-Fi with interference to 2.4G Wi-Fi without interference, to avoid the interference from the cellular network to 5G Wi-Fi.

After performing interference processing in the manner of reducing the uplink transmit power, the wireless access device may further exit the interference processing when a preset condition 1 is met. Therefore, after the interference processing is exited, the cellular signal may be sent by using higher transmit power (for example, the cellular signal is transmitted by using the transmit power before reduction). For example, after the wireless access device stops using an interfered Wi-Fi frequency band or the signal status of the cellular network deteriorates, the wireless access device may exit the interference processing. For example, the preset condition 1 may include any one or a combination of the following: the condition 4 is true; or the condition 5 is false; or the condition 1 is true, and the condition 2 and the condition 9 are false; or the condition 2 is true, and the condition 1 and the condition 10 are false; or the condition 16 and the condition 18 are true.

When the condition 4 is true, no Wi-Fi device is currently connected, and therefore the interference processing may be exited.

When the condition 5 is false, there is no Wi-Fi device whose signal status parameter is less than a first threshold, the Wi-Fi device is a non-weak-field device, the Wi-Fi device may be relatively close to the wireless access device, and even if Wi-Fi is interfered with, the Wi-Fi device may be normally used. Therefore, the interference processing may be exited.

When the condition 1 is true, and the condition 2 and the condition 9 are false, it may indicate that 2.4G Wi-Fi is currently used but 5G Wi-Fi is not used, and the frequency band used by the cellular network has no interference to 2.4G Wi-Fi. Therefore, the interference processing may be exited.

When the condition 2 is true, and the condition 1 and the condition 10 are false, it may indicate that 5G Wi-Fi is currently used but 2.4G Wi-Fi is not used, and the frequency band used by the cellular network has no interference to 5G Wi-Fi. Therefore, the interference processing may be exited.

When the condition 16 and the condition 18 are true, it may indicate that the signal status parameter of the cellular network is less than the threshold 3, and the signal status of the cellular network deteriorates. In this case, the interference processing may be exited, to avoid, as far as possible, a problem of cellular signal interruption caused by continued use of the reduced uplink transmit power of the cellular network.

In some embodiments, after determining to reduce the uplink transmit power, the wireless access device detects whether the preset condition 1 is met. If yes, the interference processing is exited.

In some other embodiments, after being powered on, the wireless access device may detect whether the preset condition 1 is met. If the wireless access device determines that the preset condition 1 is met and interference processing is performed by reducing the power, the wireless access device exits the interference optimization processing, and increases the uplink transmit power of the cellular network. If the wireless access device determines that the preset condition 1 is met but the uplink transmit power is not reduced, the wireless access device does not exit the interference optimization processing. For example, the wireless access device may determine, based on the preset condition 1 and according to a determining process shown in FIG. 5, whether to exit the interference processing.

In some other embodiments, after the uplink transmit power of the cellular network is reduced to perform interference processing, if a signal status of the Wi-Fi device is not significantly improved, for example, the RSRP or the SINR is not significantly improved, the poor signal status of the Wi-Fi device may not be caused by the interference from the cellular network to Wi-Fi. Therefore, reducing the uplink transmit power of the cellular network may be stopped. For example, the uplink transmit power of the cellular network before reduction is restored.

For another example, the wireless access device may determine, based on a Wi-Fi signal status and a Wi-Fi rate that can be experienced by the user, a degree of the interference from the cellular network to Wi-Fi, and perform interference processing.

In some embodiments, the wireless access device determines that Wi-Fi is severely interfered with when a rate of a Wi-Fi device with a worst signal status is low. In this case, the interference may be caused by the cellular network to Wi-Fi, and therefore the signal status of the Wi-Fi device is poor and experience of the rate of the Wi-Fi device is poor. Therefore, the wireless access device may reduce the uplink transmit power of the cellular network, to reduce the interference from the cellular signal to the Wi-Fi signal.

When the signal status parameter includes the received signal strength parameter and the signal quality parameter, the Wi-Fi device with a worst signal status may be a Wi-Fi device with a smallest received signal strength parameter. Alternatively, the Wi-Fi device with the worst signal status may be a Wi-Fi device with a smallest signal quality parameter. Alternatively, the Wi-Fi device with the worst signal status may be a Wi-Fi device whose received signal strength parameter is less than one threshold and whose signal quality parameter is less than another threshold.

When a rate of a Wi-Fi device is less than or equal to the threshold C, it may indicate that the rate of the Wi-Fi device is low.

When the condition 7 in Table 2 is true, the wireless access device determines that the rate of the Wi-Fi device with the worst signal status is low may be because the cellular network causes severe interference to Wi-Fi. Therefore, the uplink transmit power of the cellular network may be reduced, to reduce the interference from the cellular signal to the Wi-Fi signal.

In other words, if a rate of the Wi-Fi device with the smallest received signal strength parameter is less than the threshold C, the uplink transmit power of the cellular network may be reduced, to reduce the interference from the cellular signal to the Wi-Fi signal. Alternatively, if a rate of the Wi-Fi device with the smallest signal quality parameter is less than the threshold C, the uplink transmit power of the cellular network may be reduced, to reduce the interference from the cellular signal to the Wi-Fi signal. Alternatively, if a rate of a Wi-Fi device with a smallest received signal strength parameter and a smallest signal quality parameter is less than the threshold C, the uplink transmit power of the cellular network may be reduced, to reduce the interference from the cellular signal to the Wi-Fi signal.

In some other embodiments, when the air interface throughput of the cellular network is high, and the rate of the Wi-Fi device with the worst signal status is low, it may indicate the Wi-Fi side is a bottleneck of rate experience of the user. In this case, the cellular network causes interference to Wi-Fi, and therefore the signal status of the Wi-Fi device is poor and the experience of the rate of the Wi-Fi device is poor. Therefore, the uplink transmit power of the cellular network may be reduced, to reduce the interference from the cellular signal to the Wi-Fi signal.

For example, when the condition 7 is true, that is, the Wi-Fi rate of the Wi-Fi device with the smallest signal status parameter is less than the threshold C, and the condition 13 is true, that is, the air interface throughput of the cellular network is greater than or equal to the threshold J, the wireless access device may reduce the uplink transmit power of the cellular network, to reduce the interference from the cellular signal to the Wi-Fi signal.

In some other embodiments, the wireless access device may further determine, with reference to the frequency bands separately used by the cellular network and Wi-Fi, the interference from the cellular network to Wi-Fi, so as to perform interference processing.

For example, when the condition 9 in Table 2 is true, the wireless access device may consider that the cellular network has interference to 2.4G Wi-Fi. When the condition 10 is true, the wireless access device may consider that the cellular network has interference to 5G Wi-Fi. In addition, when the rate of the Wi-Fi device with the worst signal status is low, the cellular network may cause severe interference to Wi-Fi. As a result, the signal status of the Wi-Fi device is poor and the experience of the rate of the Wi-Fi device is poor. Therefore, the uplink transmit power of the cellular network may be reduced, to reduce the interference from the cellular signal to the Wi-Fi signal.

When the condition 7 and the condition 9 are true, or the condition 7 and the condition 10 are true, the wireless access device may reduce the uplink transmit power of the cellular network, to reduce the interference from the cellular signal to the Wi-Fi signal.

In some other embodiments, if there is a device using 2.4G Wi-Fi, the cellular network has interference to 2.4G Wi-Fi, the rate of the Wi-Fi device with the worst signal status is low, and the air interface throughput of the cellular network is high, the wireless access device may reduce the uplink transmit power of the cellular network, to reduce the interference from the cellular signal to the Wi-Fi signal.

For example, if the condition 13 is true, that is, the current air interface throughput of the cellular network is greater than or equal to the threshold J, it may indicate that the air interface throughput of the cellular network is high. When the rate of the Wi-Fi device with the worst signal status is low, and the air interface throughput of the cellular network is high, it may indicate that a rate on the cellular side is relatively high, a rate on the Wi-Fi side is low, and the Wi-Fi side is the bottleneck of the rate experience of the user. Therefore, the uplink transmit power of the cellular network may be reduced, to reduce the interference from the cellular signal to the Wi-Fi signal.

When the condition 1, the condition 3, the condition 7, the condition 9, and the condition 13 are true, the wireless access device may reduce the uplink transmit power of the cellular network, to reduce the interference from the cellular network to Wi-Fi.

In some other embodiments, if there is a device using 5G Wi-Fi, the cellular network has interference to 5G Wi-Fi, the rate of the Wi-Fi device with the worst signal status is low, and the air interface throughput on the cellular side is high, the wireless access device may reduce the uplink transmit power of the cellular network, to reduce the interference from the cellular signal to the Wi-Fi signal.

For example, when the condition 2, the condition 3, the condition 7, the condition 10, and the condition 13 are true, the wireless access device may reduce the uplink transmit power of the cellular network, to reduce the interference from the cellular network to Wi-Fi.

When the cellular network has interference to Wi-Fi, the wireless access device may alternatively switch a frequency band between 2.4G Wi-Fi and 5G Wi-Fi or switch a Wi-Fi channel, to reduce the interference from the cellular network to Wi-Fi.

Figures 1, 6A:
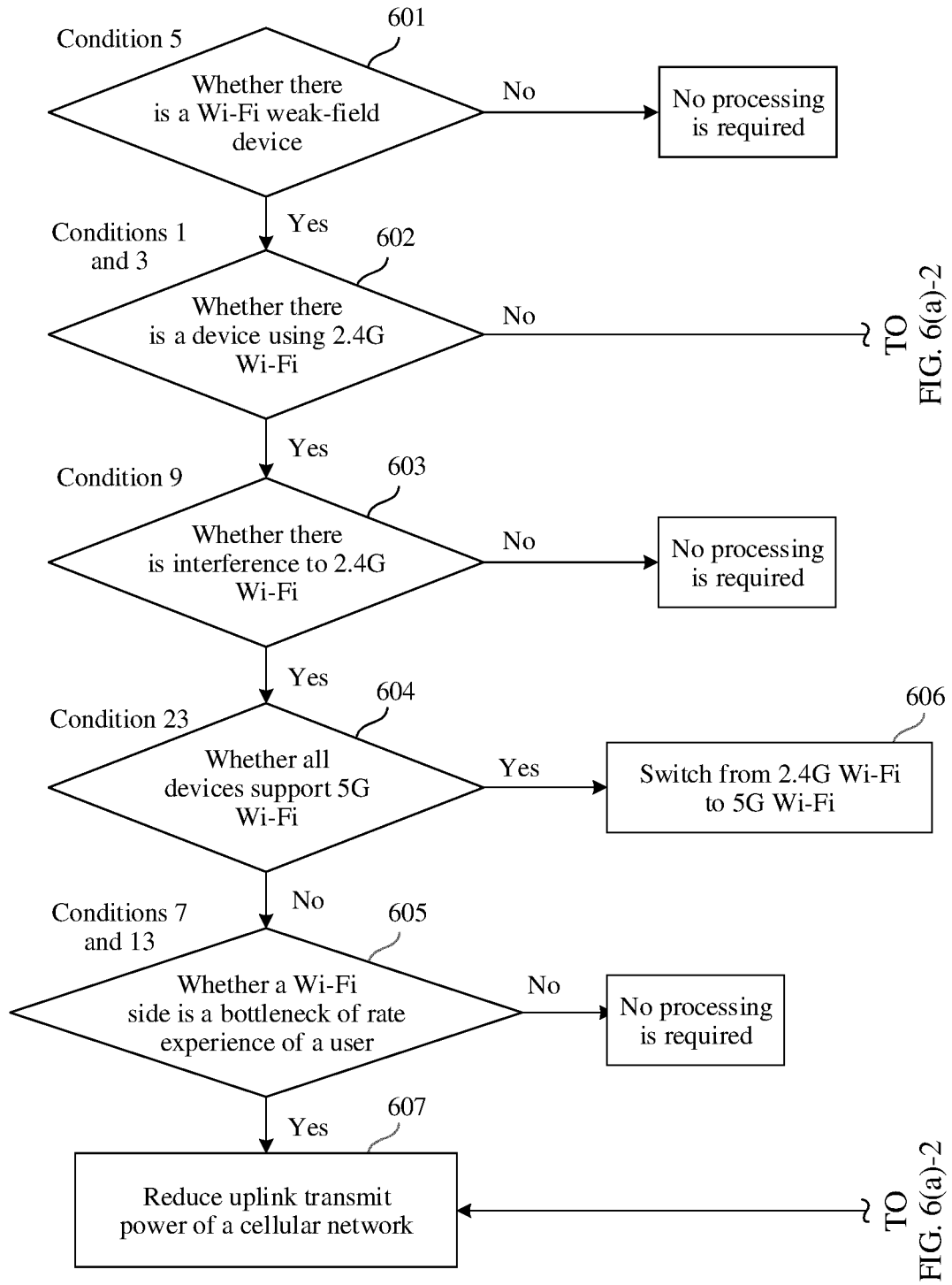
Figures 2, 6A:
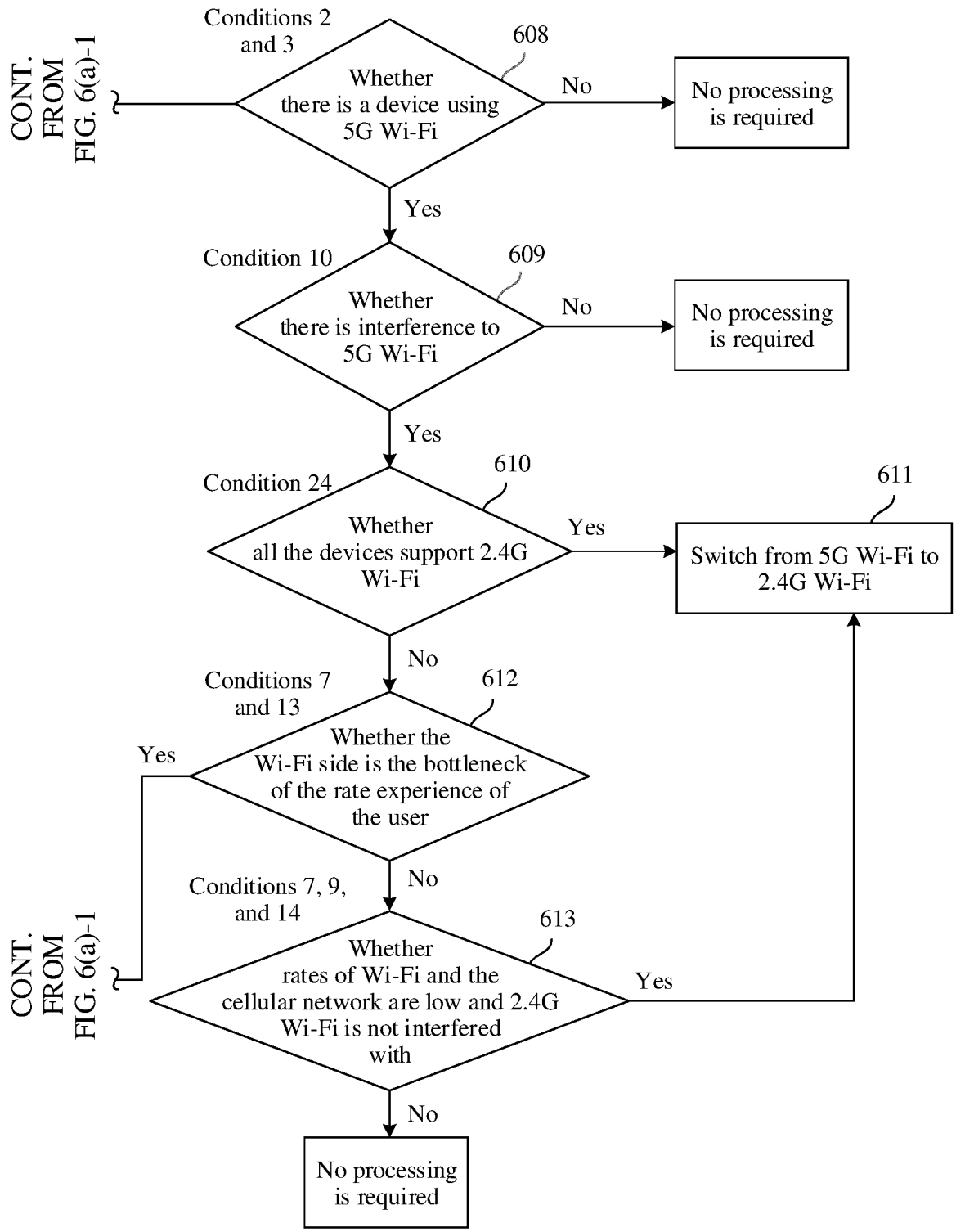
Figures 1, 6B:
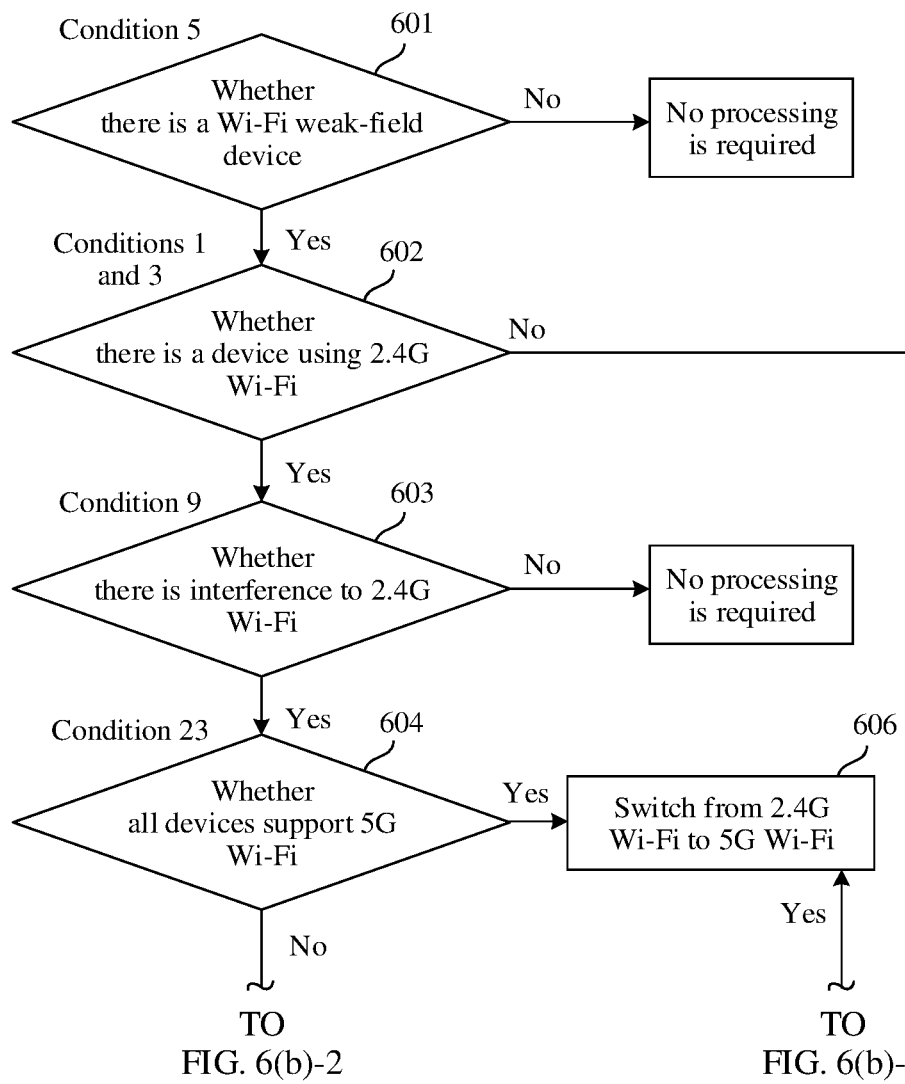
Figures 2, 6B:
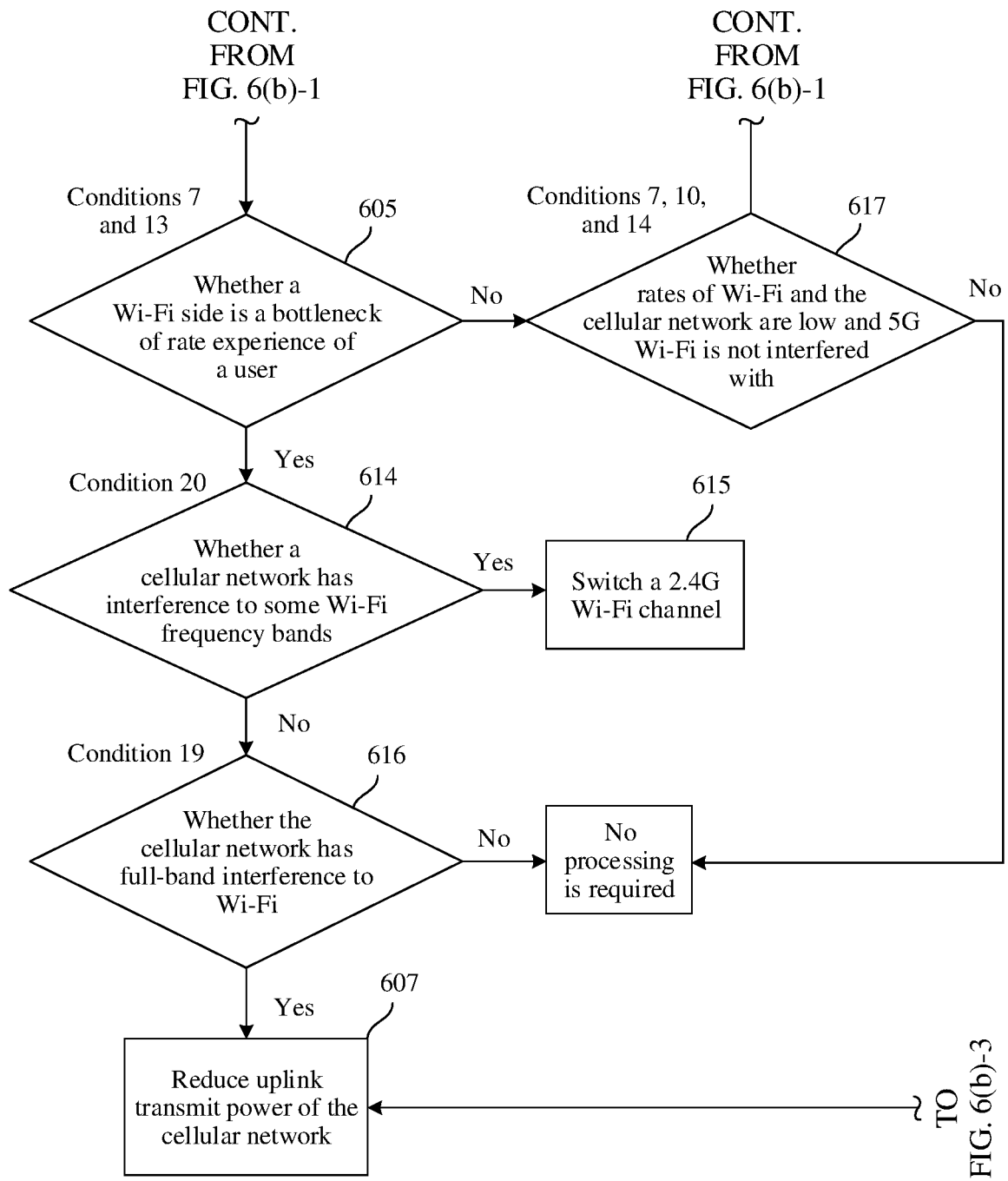
Figures 3, 6B:
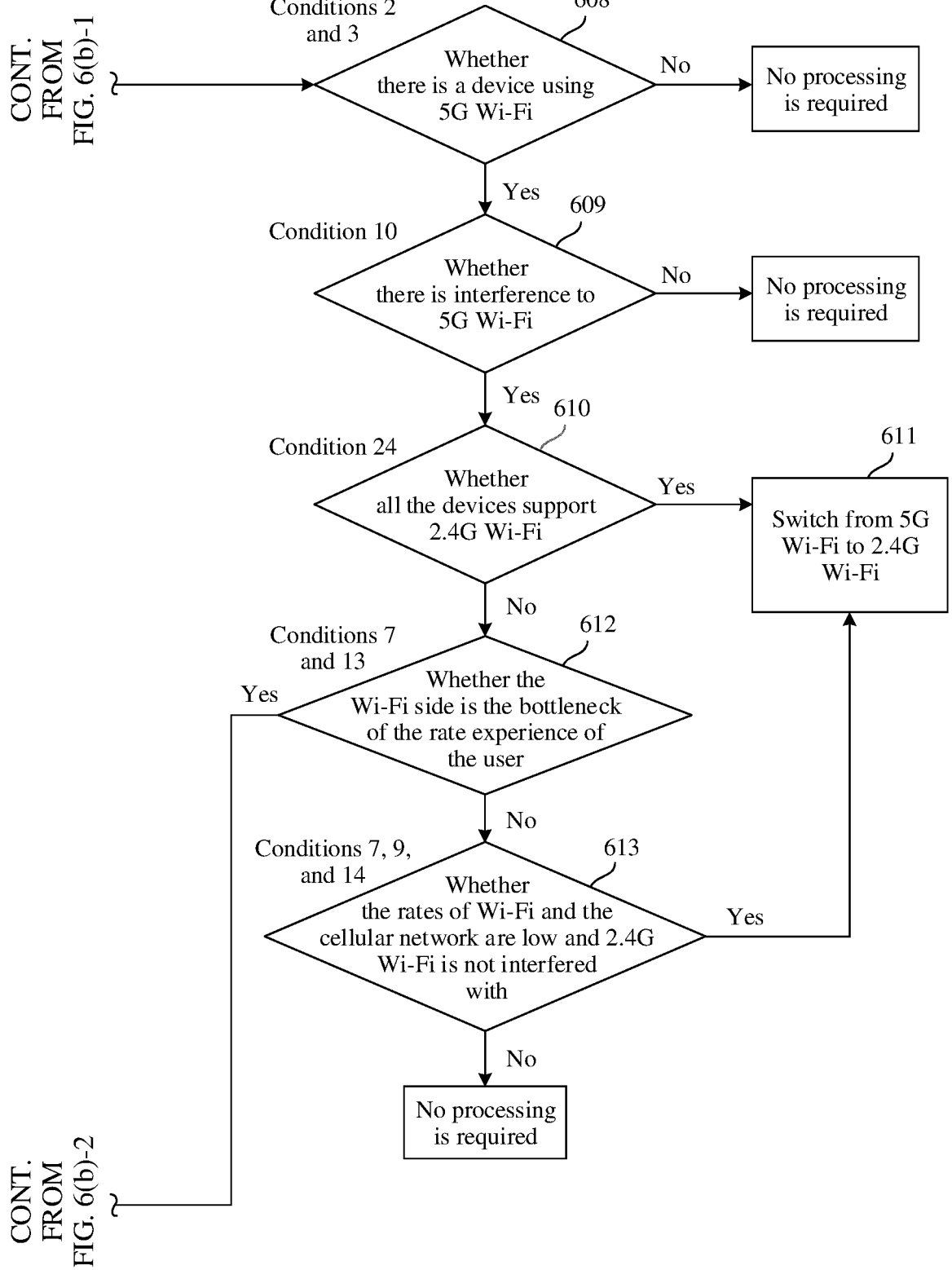
FIG. 6($a$)-1 to FIG. 6($b$)-3 are flowcharts of a group of interference processing methods according to an embodiment of this application.

For example, FIG. 6(a)-1 and FIG. 6(a)-2 provide an interference processing process. The interference processing process may include the following steps.

601: The wireless access device determines whether the condition 5 is true. If yes, step 602 is performed. If no, interference processing is not performed.

When the condition 5 is true, it may indicate that there is a Wi-Fi device whose signal status parameter is less than the threshold 1, there is a Wi-Fi weak-field device whose signal status is poor, and the Wi-Fi side may be interfered with.

602: The wireless access device determines whether the condition 1 and the condition 3 are true. If yes, step 603 is performed. If no, step 608 is performed.

When the condition 1 is true, it may indicate that the wireless access device currently uses 2.4G Wi-Fi. When the condition 3 is true, it may indicate that a Wi-Fi device is currently connected. If the condition 1 and the condition 3 are true, it may indicate that there is a device using 2.4G Wi-Fi.

603: The wireless access device determines whether the condition 9 is true, that is, whether the cellular network has interference to 2.4G Wi-Fi. If yes, step 604 is performed. If no, interference processing is not performed.

604: The wireless access device determines whether the condition 23 is true, that is, whether all Wi-Fi devices currently accessing Wi-Fi support 5G Wi-Fi. If no, step 605 is performed. If yes, step 606 is performed.

If the Wi-Fi side is a bottleneck of rate experience of a user, the wireless access device may determine whether all currently connected Wi-Fi devices support 5G Wi-Fi.

605: The wireless access device determines whether the condition 7 and the condition 13 are true. If yes, step 607 is performed. If no, interference processing is not performed.

If the condition 7 is true, that is, the current rate of the device with the worst Wi-Fi signal status is less than C, and the condition 13 is true, that is, the current air interface throughput of the cellular network is greater than the threshold J, it may indicate that a current rate of the cellular network is high, a current rate of Wi-Fi is low, and rate experience of the user is limited on the Wi-Fi side. In other words, the Wi-Fi side is the bottleneck of the rate experience of the user.

606: The wireless access device switches from 2.4G Wi-Fi to 5G Wi-Fi.

If the frequency band used by the cellular network has interference to 2.4G Wi-Fi, the Wi-Fi side is the bottleneck of the rate experience of the user, and all the currently connected Wi-Fi devices support 5G Wi-Fi, the wireless access device may switch from 2.4G Wi-Fi to 5G Wi-Fi, to avoid the interference from the cellular network to 2.4G Wi-Fi.

607: The wireless access device reduces the uplink transmit power of the cellular network, to reduce the interference from the cellular network to 2.4G Wi-Fi.

If the frequency band used by the cellular network has interference to 2.4G Wi-Fi, the Wi-Fi side is the bottleneck of the rate experience of the user, and not all the currently connected Wi-Fi devices support 5G Wi-Fi, the wireless access device cannot switch to 5G Wi-Fi to reduce the interference, but may reduce the uplink transmit power of the cellular network, to reduce the interference from the cellular network to 2.4G Wi-Fi.

608: The wireless access device determines whether the condition 2 and the condition 3 are true. If yes, step 609 is performed. If no, interference processing is not performed.

When the condition 2 is true, it may indicate that the wireless access device currently uses 5G Wi-Fi. When the condition 3 is true, it may indicate that a Wi-Fi device is currently connected. If the condition 2 and the condition 3 are true, it may indicate that there is a device using 5G Wi-Fi.

609: The wireless access device determines whether the condition 10 is true, that is, whether the cellular network has interference to 5G Wi-Fi. If yes, step 610 is performed. If no, interference processing is not performed.

If the condition 10 is false, that is, the frequency band used by the cellular network has no interference to 5G Wi-Fi, interference processing does not need to be performed.

610: The wireless access device determines whether the condition 24 is true, that is, whether all the currently connected Wi-Fi devices support 2.4G Wi-Fi. If yes, step 611 is performed. If no, step 612 is performed.

Similar to step 412, if the Wi-Fi device supports 2.4G Wi-Fi by default, step 610 may be omitted. After the condition in step 609 is met, step 611 may be performed.

611: The wireless access device switches from 5G Wi-Fi to 2.4G Wi-Fi.

If there is interference to 5G Wi-Fi, and all the currently connected Wi-Fi devices support 2.4G Wi-Fi, the wireless access device may switch from 5G Wi-Fi to 2.4G Wi-Fi, to avoid the interference from the cellular network to 5G Wi-Fi.

612: The wireless access device determines whether the condition 7 and the condition 13 are true, that is, whether the current rate of the device with the worst Wi-Fi signal status is less than C. If yes, step 607 is performed. If no, step 613 is performed.

If the condition 7 is met, that is, the rate of the device with the worst Wi-Fi signal status is low, it may indicate that Wi-Fi rate experience of the user using the device is poor, and 5G Wi-Fi is severely interfered with. If the rate of the device with the worst Wi-Fi signal status is high, it may indicate that interference to 5G Wi-Fi is not severe, and therefore interference processing may not be performed.

If the condition 13 is met, the current air interface throughput of the cellular network is greater than the threshold J. If the condition 7 and the condition 13 are true, that is, the current rate of the device with the worst Wi-Fi signal status is less than C, and the current air interface throughput on the cellular side is greater than the threshold J, it may indicate that interference on the Wi-Fi side is severe, and the air interface throughput of the cellular network is high. The wireless access device may perform step 607, to reduce the uplink transmit power of the cellular network, so as to reduce the interference of the cellular network to 5G Wi-Fi.

613: The wireless access device determines whether the condition 7 and the condition 14 are true, and whether the condition 9 is false. If yes, step 611 is performed. If no, interference processing is not performed.

If the condition 14 is true, that is, the current air interface throughput of the cellular network is less than the threshold K, it may indicate that the air interface throughput of the cellular network is low. If the condition 7 and the condition 14 are true, and the condition 9 is false, it may indicate that the interference on the Wi-Fi side is severe, the rate on the cellular side is low, and the cellular may not interfere with 2.4G Wi-Fi. Therefore, the wireless access device may perform step 611, to switch from 5G Wi-Fi to 2.4G Wi-Fi, so as to avoid the interference from the cellular to 5G Wi-Fi. Otherwise, the wireless access device does not perform interference processing.

In some other embodiments, refer to in FIG. 6(*b*)-1 to FIG. 6(*b*)-3. If it is determined that step 605 is yes, step 614 is performed.

614: The wireless access device determines whether the condition 20 is true, that is, whether the cellular network has interference to some Wi-Fi frequency bands. If yes, step 615 is performed. If no, step 616 is performed.

615: The wireless access device switches a 2.4G Wi-Fi channel, to avoid or reduce the interference from the cellular network to some 2.4G Wi-Fi frequency bands.

If the cellular network has interference to some Wi-Fi frequency bands, the wireless access device may switch to a channel on which 2.4G Wi-Fi is not interfered with, to avoid or reduce the interference from the cellular network to some 2.4G Wi-Fi frequency bands.

616: The wireless access device determines whether the condition 19 is true, that is, whether the cellular network has full-band interference to Wi-Fi. If yes, step 607 is performed. If no, interference processing is not performed.

In some other embodiments, if it is determined that step 605 is no, step 617 may be performed.

617: The wireless access device determines whether the condition 7 and the condition 14 are true, and whether the condition 10 is false. If yes, step 606 is performed. If no, interference processing is not performed.

If the condition 7 and the condition 14 are true, and the condition 10 is false, it may indicate that the interference on the Wi-Fi side is severe, the rate on the cellular side is low, and the cellular network does not interfere with 5G Wi-Fi. Therefore, the wireless access device may perform step 606, to switch from 2.4G Wi-Fi to 5G Wi-Fi, so as to avoid the interference from the cellular network to 2.4G Wi-Fi. Otherwise, the wireless access device does not perform interference processing.

After performing interference processing in the manner of reducing the uplink transmit power, the wireless access device may further exit the interference processing when a preset condition 2 is met. Therefore, after the interference processing is exited, the cellular signal may be sent by using higher transmit power (for example, the cellular signal is transmitted by using the transmit power before reduction). For example, after the wireless access device stops using an interfered Wi-Fi frequency band or the signal status of the cellular network deteriorates, the interference processing may be exited. For example, the preset condition 2 may include one or a combination of the following: the condition 4 is true; or the condition 5 is true; or the condition 1 is true, and the condition 2 and the condition 9 are false; or the condition 2 is true, and the condition 1 and the condition 10 are false; or the condition 8 and the condition 18 are true; or the condition 14 and the condition 18 are true.

When the condition 8 is true, the current rate of the device with the worst Wi-Fi signal status is greater than or equal to the threshold D. When the condition 16 or the condition 18 is true, it may indicate that the signal status parameter of the cellular network is less than or equal to the threshold 3. When the condition 8 is true, and the condition 16 or the condition 18 is true, it may indicate that experience of the rate of the Wi-Fi device gets better, and the signal status of the cellular network deteriorates. Therefore, the interference processing may be exited, to avoid, as far as possible, a problem of cellular signal interruption caused by continued use of the reduced uplink transmit power of the cellular network.

When the condition 14 is true, and the condition 16 or the condition 18 is true, the current air interface throughput of the cellular network is less than the threshold K, and the signal status parameter of the cellular network is less than or equal to the threshold 3, it may indicate that the air interface throughput of the cellular network deteriorates, and the signal status of the cellular network also deteriorates. Therefore, the interference processing may be exited, to avoid, as far as possible, the problem of cellular signal interruption caused by continued use of the reduced uplink transmit power of the cellular network.

Figure 5:
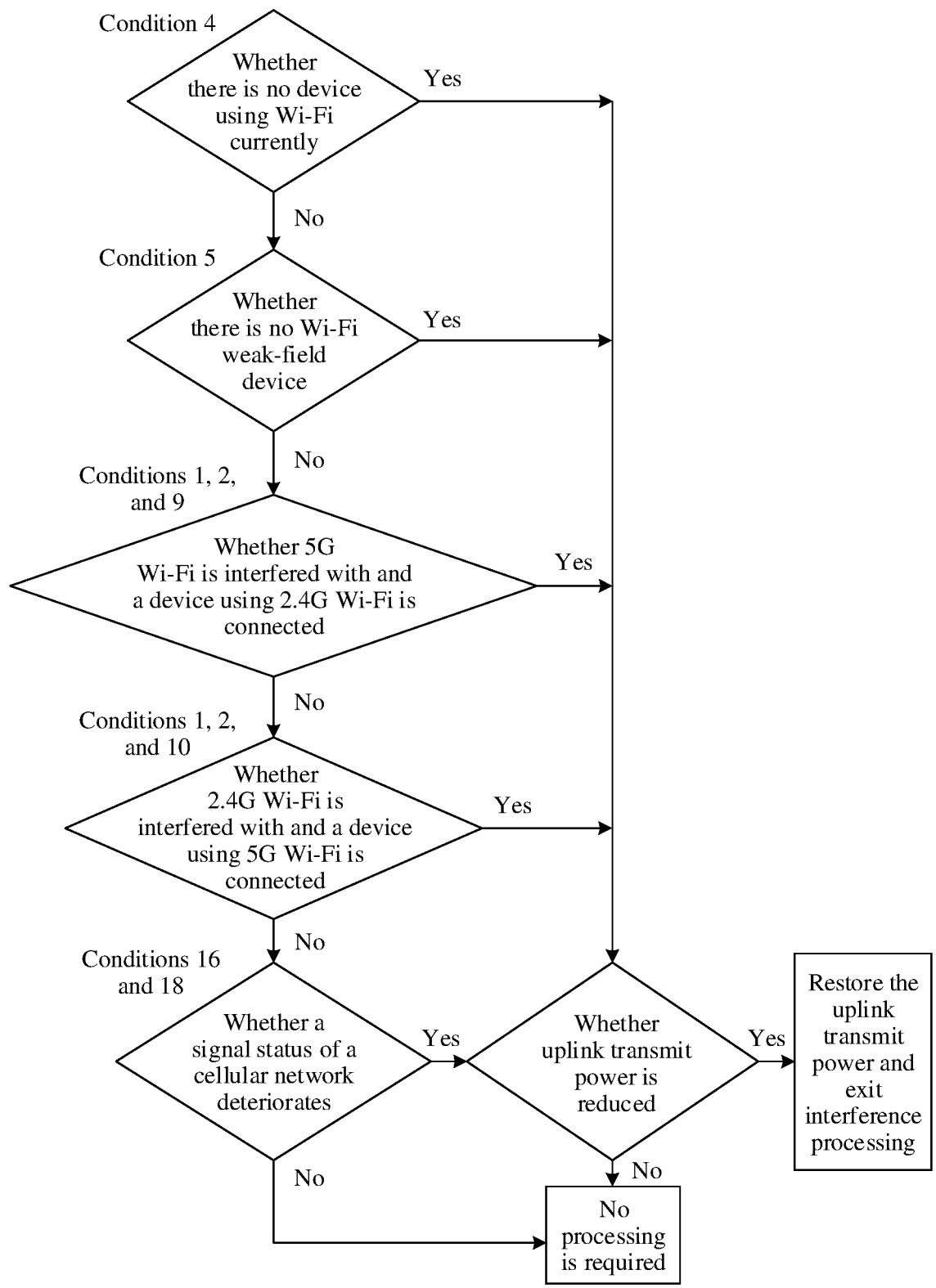
FIG. 5 is a flowchart of a method for exiting interference processing according to an embodiment of this application.

For descriptions of another condition for exiting the interference processing in the preset condition 2, refer to descriptions of the same condition in FIG. 5. Details are not described herein.

In some embodiments, after determining to reduce the uplink transmit power, the wireless access device detects whether the preset condition 2 is met. If yes, the interference processing is exited.

Figure 7A:
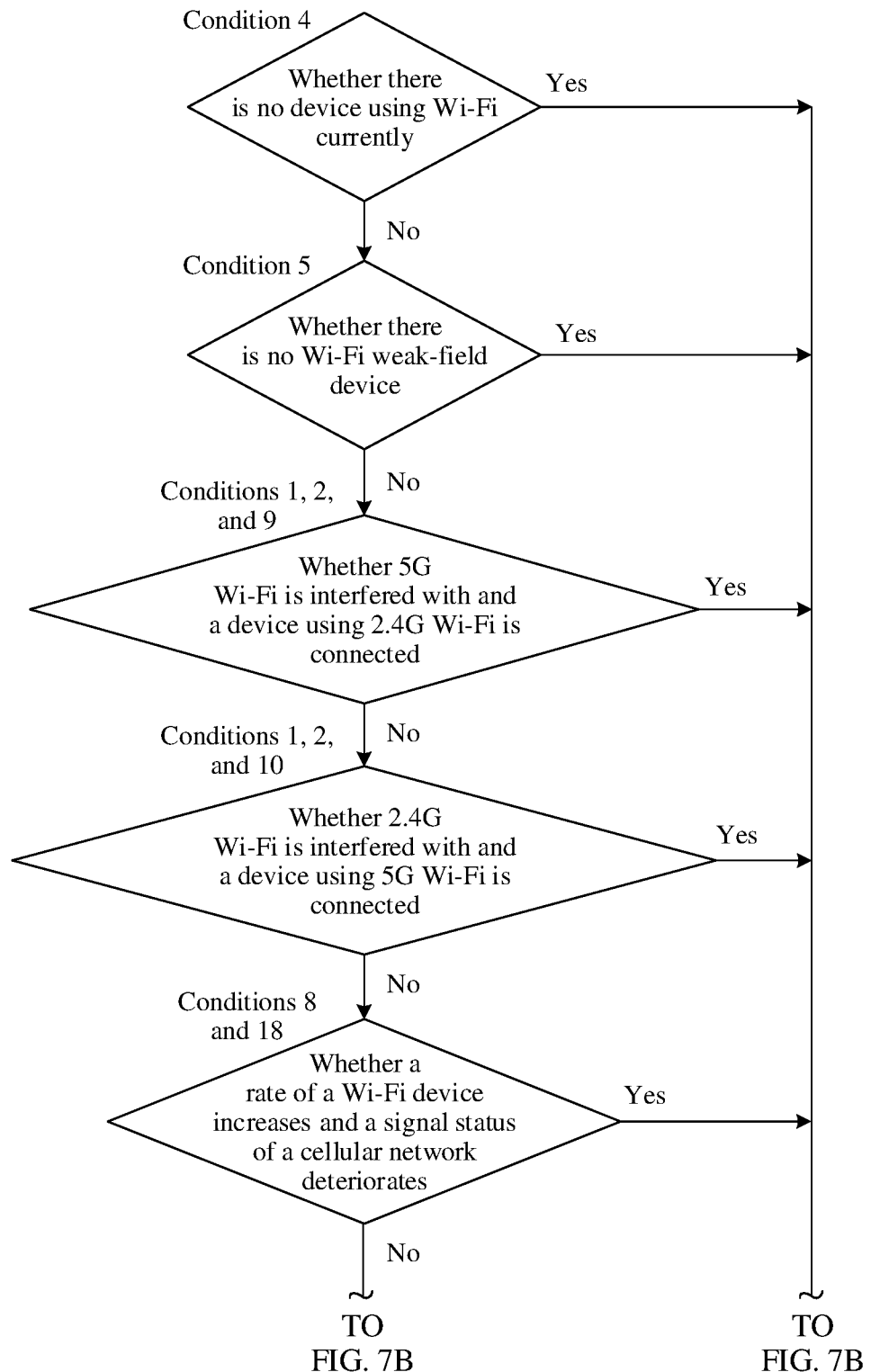
FIG. 7A and FIG. 7B are a flowchart of another method for exiting interference processing according to an embodiment of this application.
Figure 7B:
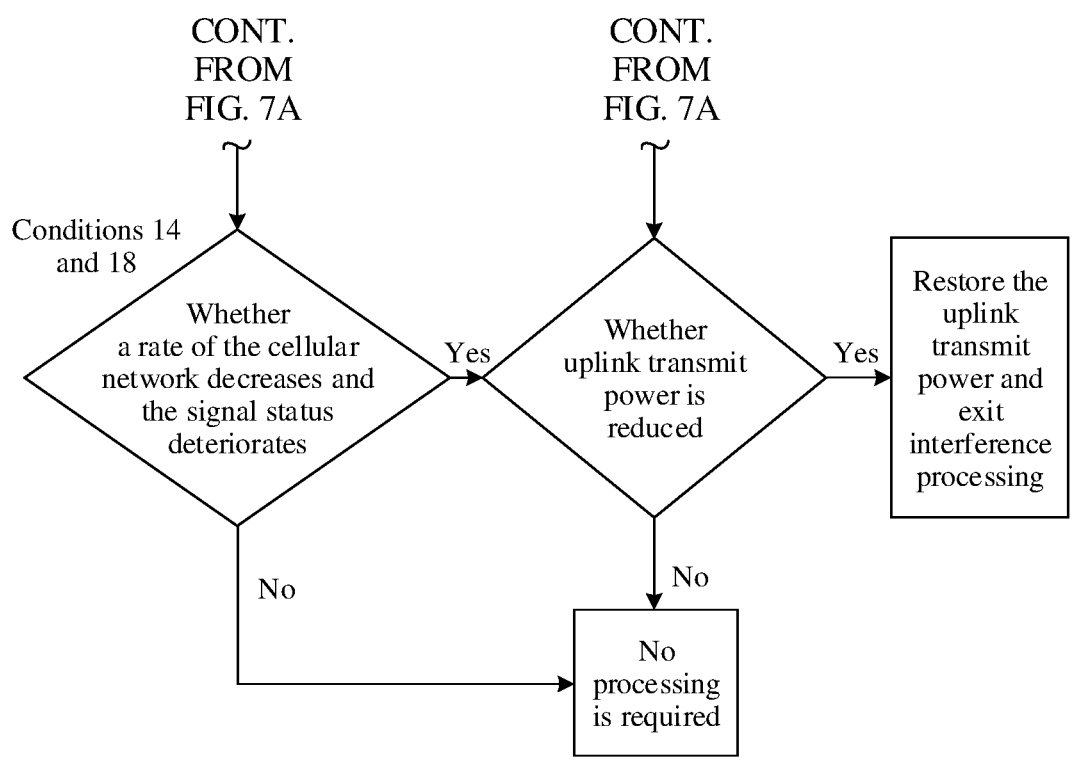

In some other embodiments, after being powered on, the wireless access device may detect whether the preset condition 2 is met. If the wireless access device determines that the preset condition 2 is met and interference processing is performed by reducing the power, the wireless access device exits the interference optimization processing, and increases the uplink transmit power of the cellular network. If the wireless access device determines that the preset condition 2 is met but the uplink transmit power is not reduced, the wireless access device does not exit the interference optimization processing. For example, the wireless access device may determine, based on the preset condition 2 and according to a determining process shown in FIG. 7A and FIG. 7B, whether to exit the interference processing.

In some other embodiments, after the uplink transmit power of the cellular network is reduced to perform interference processing, if the signal status of the Wi-Fi device or the rate experience of the user is not significantly improved, for example, the rate on the Wi-Fi side is not significantly improved, the low rate of the Wi-Fi device may not be caused by the interference from the cellular network to Wi-Fi. Therefore, reducing the uplink transmit power of the cellular network may be stopped. For example, the uplink transmit power of the cellular network before reduction is restored.

It should be noted that FIG. 4A to FIG. 4C, FIG. 6(a)-1 and FIG. 6(a)-2, or FIG. 6(b)-1 to FIG. 6(b)-3 is merely an example of interference processing solutions. There may be another process for the interference processing provided in the embodiments of this application. In addition, sequences of some determining conditions in FIG. 4A to FIG. 4C, FIG. 6(a)-1 and FIG. 6(a)-2, and FIG. 6(b)-1 to FIG. 6(b)-3 may be exchanged. For example, for the processing process shown in FIG. 4A to FIG. 4C, the wireless access device may first perform step 411 to determine whether there is a device using 5G Wi-Fi, and then perform step 402 to determine whether there is a device using 2.4G Wi-Fi.

In some other embodiments, the wireless access device determines that Wi-Fi is severely interfered with when there is a Wi-Fi weak-field device and a rate of the Wi-Fi weak-field device is low. In this case, the cellular network may cause severe interference to Wi-Fi, and therefore the signal status of the Wi-Fi device is poor and the experience of the rate of the Wi-Fi device is poor. Therefore, the uplink transmit power of the cellular network may be reduced, to reduce the interference from the cellular signal to the Wi-Fi signal.

For another example, the wireless access device may determine, with reference to the signal statuses of Wi-Fi and the cellular network and a Wi-Fi rate that can be experienced by the user, a degree of the interference from the cellular network to Wi-Fi, and perform interference processing.

In some embodiments, when determining that there is a Wi-Fi device whose signal status is poor, a rate of the Wi-Fi device with the worst signal status is also low, the signal status of the cellular network is good, and the uplink transmit power of the cellular network is high, the wireless access device may determine that the interference from the cellular network to Wi-Fi is severe. As a result, the signal status of the Wi-Fi device is relatively poor and the experience of the rate of the Wi-Fi device is relatively poor. Therefore, the uplink transmit power of the cellular network may be reduced, to reduce the interference from the cellular signal to the Wi-Fi signal.

For example, step 408 in FIG. 4B may be replaced with step 408a (not shown in the figure): The wireless access device determines whether the condition 19, the condition 11, the condition 15, the condition 17, the condition 7 and the condition 13 are true. If yes, it may indicate that the signal status of the cellular network is good, the uplink transmit power of the cellular network is high, the cellular network has full-band interference to 2.4G Wi-Fi, the rate of the device with the worst Wi-Fi signal status is also low, the rate of the cellular network is relatively high, and the interference from the cellular network to 2.4G Wi-Fi is severe. Therefore, the wireless access device may perform step 409 to reduce the uplink transmit power of the cellular network, so as to reduce the interference from the cellular network to 2.4G Wi-Fi.

Step 415 in FIG. 4C may be replaced with step 415a (not shown in the figure): The wireless access device may determine whether the condition 11, the condition 15, the condition 17, the condition 7 and the condition 13 are true. If the condition 11, the condition 15, the condition 17, the condition 7, and the condition 13 in step 415 are true, it may indicate that the signal status of the cellular network is good, the uplink transmit power of the cellular network is high, the rate of the device with the worst Wi-Fi signal status is low, the rate of the cellular network is high, and the interference from the cellular network to 5G Wi-Fi is severe. Therefore, the wireless access device may perform step 409 to reduce the uplink transmit power of the cellular network, so as to reduce the interference from the cellular network to Wi-Fi.

For another example, step 605 in FIG. 6(a)-1 may be replaced with step 605a (not shown in the figure): The wireless access device determines whether the condition 7, the condition 13, the condition 19, the condition 11, the condition 15, and the condition 17 are true. Step 612 may be replaced with step 612a (not shown in the figure): The wireless access device determines whether the condition 7, the condition 13, and the condition 11, the condition 15, and the condition 17 are true.

After performing interference processing by reducing the uplink transmit power, the wireless access device may further exit the interference processing when a preset condition 3 is met. The preset condition 3 may include the preset condition 1 and/or the preset condition 2.

In some other embodiments, the wireless access device may combine the conditions that are used to trigger interference processing in FIG. 4A to FIG. 4C and FIG. 6(a)-1 and FIG. 6(a)-2, and obtain a better condition combination based on a plurality of pieces of actual test data, to trigger interference processing based on the condition combination. The wireless access device may further perform automatic iterative learning by using the actual test data, to determine a better condition combination used to determine whether to perform interference processing, so as to provide better use experience for the user.

In a technical solution, the wireless access device may separately perform interference processing by using a plurality of different preset condition combinations. If a plurality of test results show that interference on the Wi-Fi side is significantly reduced after interference processing is performed based on a condition combination, it may be determined that the condition combination has a better effect, and the condition combination may be selected for interference processing subsequently.

In another technical solution, the wireless access device may first perform interference processing based on the conditions in the process shown in FIG. 4A to FIG. 4C. If interference on the Wi-Fi side is not significantly reduced after the interference processing, the wireless access device may switch to use the conditions in the processes shown in FIG. 6(a)-1 to FIG. 6(b)-3 to perform interference processing. Alternatively, the wireless access device may first perform interference processing based on the conditions in the processes shown in FIG. 6(a)-1 to FIG. 6(b)-3. If interference on the Wi-Fi side is not significantly reduced after the interference processing, the wireless access device may switch to use the conditions in the process shown in FIG. 4A to FIG. 4C to perform interference processing. Then, if the interference on the Wi-Fi side is still not significantly reduced after the interference processing, the wireless access device may perform interference processing with reference to the conditions in the processes shown in FIG. 4A to FIG. 4C and FIG. 6(a)-1 to FIG. 6(b)-3.

In another technical solution, the wireless access device may first perform interference processing based on the conditions in the process shown in FIG. 4A to FIG. 4C. If a plurality of test results show that interference on the Wi-Fi side is not significantly reduced after the interference processing, the wireless access device may perform interference processing with reference to another condition shown in FIG. 6(a)-1 to FIG. 6(b)-3. For example, step 408 in FIG. 4B may be replaced with step 408a, and step 415 may be replaced with step 415a.

Alternatively, the wireless access device may first perform interference processing by using the conditions in the processes shown in FIG. 6(a)-1 to FIG. 6(b)-3. If a plurality of test results show that interference on the Wi-Fi side is not significantly reduced after the interference processing, the wireless access device may perform interference processing with reference to another condition shown in FIG. 4A to FIG. 4C. For example, step 605 in FIG. 6(a)-1 may be replaced with step 605a, and step 612 may be replaced with step 612a.

Figure 8A:
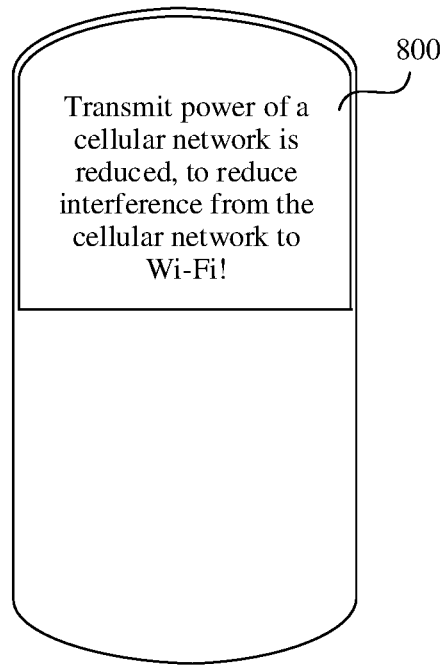
FIG. 8A is a schematic diagram of a prompt according to an embodiment of this application.

In some other embodiments, after performing interference processing, the wireless access device may prompt, by using a sound, an indicator, a vibration, or information displayed on a screen, the user that Wi-Fi interference processing is performed. For example, as shown in FIG. 8A, the wireless access device may display information on a display 800 to prompt the user that the transmit power of the cellular network is reduced to reduce the interference from the cellular signal to the Wi-Fi signal.

Figure 8B:
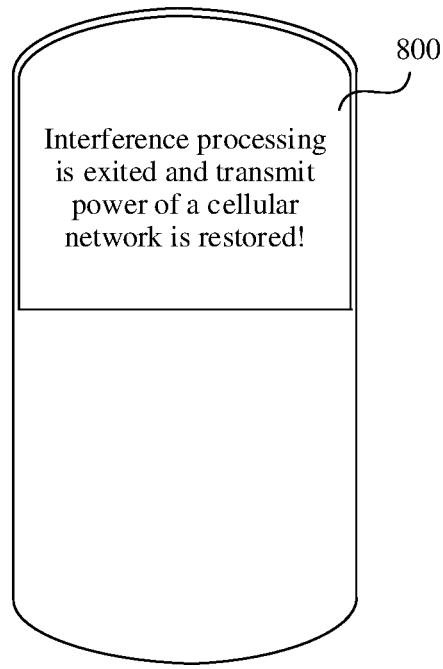
FIG. 8B is a schematic diagram of another prompt according to an embodiment of this application.

After exiting the interference processing, the wireless access device may also prompt, by using a sound, an indicator, a vibration, or information displayed on a screen, the user that the interference processing on Wi-Fi is exited. For example, as shown in FIG. 8B, the wireless access device displays information on a display 800 to prompt the user that interference processing is exited, and the transmit power of the cellular network is restored.

In the foregoing embodiments, interference processing may be performed based on a situation of the Wi-Fi device whose signal status is poor. In some other embodiments, the wireless access device may further perform interference processing by comprehensively considering conditions of all devices on the Wi-Fi side, so that most devices can normally use Wi-Fi.

For example, in a technical solution, if a Wi-Fi rate of a Wi-Fi weak-field device with a worst signal status is relatively low, and Wi-Fi rates of other Wi-Fi non-weak-field devices are significantly higher, the signal status of the cellular network may be relatively good. Therefore, rates of most Wi-Fi devices are relatively high. In this case, reducing the uplink transmit power of the cellular network does not easily cause cellular signal interruption. Therefore, the wireless access device may reduce the uplink transmit power of the cellular network, to reduce interference from the cellular network to the Wi-Fi weak-field device with the worst signal status. In addition, it is ensured that other non-weak-field devices can normally communicate and the Wi-Fi rates are relatively high.

If a Wi-Fi rate of a Wi-Fi weak-field device with a worst signal status is relatively low, and Wi-Fi rates of other non-weak-field devices are higher than the Wi-Fi rate of the weak-field device, but not much different from the Wi-Fi rate of the weak-field device, the signal status on the cellular side may be poor. Therefore, rates of most Wi-Fi devices are not very high. In this case, reducing the uplink transmit power of the cellular network easily causes cellular signal interruption, thereby causing interruption of the source of the Wi-Fi signal. Therefore, the uplink transmit power of the cellular network may not be reduced, to ensure that most Wi-Fi non-weak-field devices can normally communicate.

In some other embodiments, after determining that the uplink transmit power needs to be reduced for interference processing, the wireless access device may alternately use (for example, periodically switch between) a high transmit power and a low transmit power to transmit cellular uplink signals. When the high transmit power is used, the cellular network may have strong interference to Wi-Fi or another wireless signal, but cellular communication can be performed normally. When the low transmit power is used to send the cellular uplink signal, cellular communication may be affected, but interference from the cellular network to Wi-Fi is small, and Wi-Fi communication can be normally performed. Thus, a plurality of wireless technologies such as the cellular wireless technology and the Wi-Fi wireless technology can be used.

It should be noted that the foregoing descriptions are provided by using an example in which the first wireless technology is the cellular wireless communications technology, the second wireless technology is the Wi-Fi wireless communications technology, and the wireless access device converts a cellular signal into a Wi-Fi signal. The first wireless technology or the second wireless technology may alternatively be another wireless technology. For example, the first wireless technology is the Wi-Fi wireless communications technology, and the second wireless technology is the cellular communications technology. The wireless access device may convert a Wi-Fi signal into a cellular signal. For another example, the first wireless technology is the cellular wireless communications technology, and the second wireless technology is the Bluetooth wireless communications technology. For another example, the first wireless technology is the Wi-Fi wireless communications technology, and the second wireless technology is the Bluetooth wireless communications technology. When the first wireless technology or the second wireless technology is another wireless technology, the interference processing method provided in the foregoing embodiment may still be used to reduce interference from the first wireless technology to the second wireless technology. Details are not described herein.

For example, when the first wireless technology is the Wi-Fi wireless communications technology, and the second wireless technology is the cellular communications technology, the Wi-Fi signal may also have interference to the cellular signal. If there is a cellular device whose signal status parameter is less than a first threshold in cellular devices connected to the wireless access device, uplink transmit power of Wi-Fi is greater than or equal to a second threshold, and a signal status parameter of Wi-Fi is greater than or equal to a third threshold, the wireless access device may reduce the uplink transmit power of Wi-Fi, to reduce interference from the Wi-Fi signal to the cellular signal. Alternatively, if an air interface throughput of a cellular device with a smallest signal status parameter in cellular devices connected to the wireless access device is less than a fourth threshold, and a Wi-Fi rate of a Wi-Fi device is greater than or equal to a fifth threshold, the wireless access device may reduce uplink transmit power of Wi-Fi, to reduce interference from the Wi-Fi signal to cellular signal.

Figure 9:
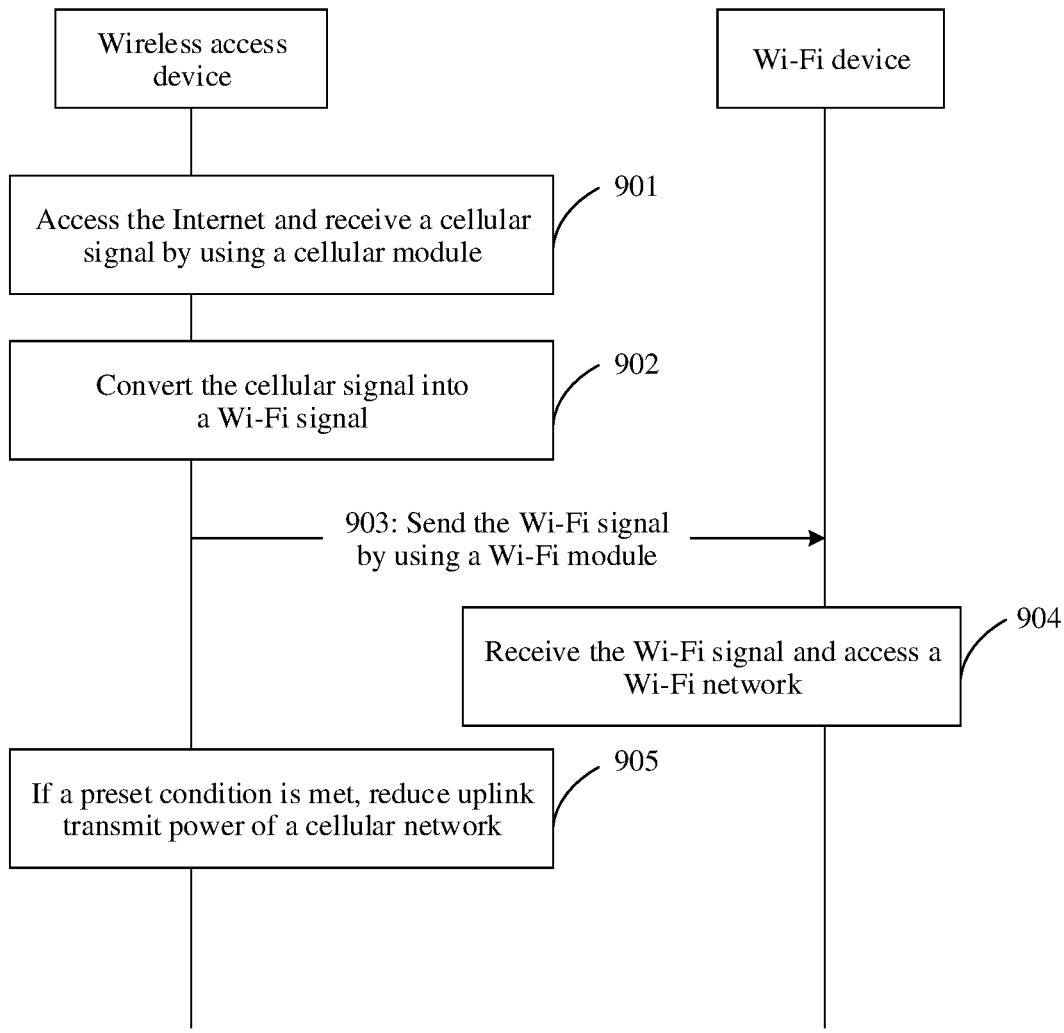
FIG. 9 is a flowchart of another interference processing method according to an embodiment of this application.

With reference to the foregoing embodiments and the corresponding accompanying drawings, another embodiment of this application provides an interference processing method. The method may be implemented on a wireless access device having the structure shown in FIG. 3A and a Wi-Fi device. As shown in FIG. 9, the method may include the following steps.

901: The wireless access device accesses the Internet and receives a cellular signal by using a cellular module.

902: The wireless access device converts the cellular signal into a Wi-Fi signal.

903: The wireless access device sends the Wi-Fi signal by using a Wi-Fi module.

904: The Wi-Fi device receives the Wi-Fi signal and access a Wi-Fi network.

905: If a preset condition is met, the wireless access device reduces uplink transmit power of a cellular network, to reduce interference from the cellular signal to the Wi-Fi signal.

The preset condition includes: There is a Wi-Fi device whose signal status parameter is less than a first threshold in connected Wi-Fi devices, the uplink transmit power of the cellular network is greater than or equal to a second threshold, and a signal status parameter of the cellular network is greater than or equal to a third threshold; and/or determines that a Wi-Fi rate of a Wi-Fi device with a smallest signal status parameter in the connected Wi-Fi devices is less than a fourth threshold, and an air interface throughput of the cellular network is greater than or equal to a fifth threshold.

In the solution described in step 901 to step 905, the wireless access device may convert the cellular signal into the Wi-Fi signal and forward the Wi-Fi signal for access by the Wi-Fi device. When there is the Wi-Fi device whose signal status parameter is less than the first threshold, the uplink transmit power of the cellular network is greater than or equal to the second threshold, and the signal status parameter of the cellular network is greater than or equal to the third threshold, that is, when a signal status of the Wi-Fi device is poor, the uplink transmit power of the cellular network is high, and a signal status of the cellular network is good, the wireless access device may determine that the cellular network has severe interference to Wi-Fi. Therefore, the uplink transmit power of the cellular network may be reduced, to reduce the interference from the cellular signal to the Wi-Fi signal. When the Wi-Fi rate of the Wi-Fi device with the smallest signal status parameter in the connected Wi-Fi devices is less than the fourth threshold, and the air interface throughput of the cellular network is greater than or equal to the fifth threshold, that is, when the air interface throughput of the cellular network is high, and the rate of the Wi-Fi device with the worst signal status is low, it may indicate that the Wi-Fi side is a bottleneck of rate experience of a user, the cellular network causes interference to Wi-Fi, and therefore the signal status of the Wi-Fi device is poor and experience of the rate of the Wi-Fi device is poor. Therefore, the uplink transmit power of the cellular network may be reduced, to reduce the interference from the cellular signal to the Wi-Fi signal.

An embodiment of this application further provides a wireless access device, and the wireless access device may include a receiving unit, a conversion unit, a sending unit, a processing unit, and the like. The receiving unit may support the wireless access device in performing step 901. The conversion unit may support the wireless access device in performing step 902. The sending unit may support the wireless access device in performing step 903. The processing unit may support the wireless access device in performing step 905.

An embodiment of this application further provides a wireless access device, including: one or more processors; a memory; a cellular module, configured to access the Internet and receive a cellular signal by the wireless access device; a wireless fidelity (Wi-Fi) module, configured to send a Wi-Fi signal by the wireless access device; and one or more computer programs, where the one or more computer programs are stored in the memory, and the one or more computer programs include instructions. When the instructions are executed by the one or more processors, the wireless access device is enabled to perform the steps in the foregoing embodiments.

For example, when the wireless access device is the electronic device shown in FIG. 3A, the processor in the wireless access device may be the processor 310 in FIG. 3A, the memory in the wireless access device may be the memory 320 in FIG. 3A, the cellular module in the wireless access device may be the first communications module 330 in FIG. 3A, and the Wi-Fi module in the wireless access device may be the second communications module 340 in FIG. 3A.

An embodiment of this application further provides a computer storage medium. The computer storage medium stores computer instructions. When the computer instructions are run on a wireless access device, the wireless access device is enabled to perform the foregoing related method steps to implement the interference processing method in the foregoing embodiments.

An embodiment of this application further provides a computer program product. When the computer program product runs on a computer, the computer is enabled to perform the foregoing related steps, to implement the interference processing method in the foregoing embodiments.

In addition, an embodiment of this application further provides an apparatus. The apparatus may be specifically a chip, and the chip may include a processor and a data interface. The data interface may be configured to obtain a cellular signal from a cellular module. The processor may be configured to demodulate the cellular signal, and modulate a demodulated cellular. The data interface is further configured to transmit a modulated signal to a Wi-Fi module. The processor is further configured to perform step 905 to perform interference processing.

In addition, an embodiment of this application further provides an apparatus. The apparatus may be specifically a component or a module. The apparatus may include a processor and a memory that are connected to each other. The memory is configured to store computer-executable instructions. When the apparatus runs, the processor may execute the computer-executable instructions stored in the memory, to enable the apparatus to perform the interference processing method in the foregoing method embodiments.

The wireless access device, the computer storage medium, the computer program product, or the chip provided in the embodiments of this application may be configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for convenient and brief description, division into the foregoing function modules is used as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division, and may be other division in an actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may be one or more physical units, may be located in one place, or may be distributed at different places. Some or all of the units may be selected based on an actual requirement to achieve an objective of a solution of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications system, comprising a wireless access device and a plurality of wireless fidelity (Wi-Fi) devices connected to the wireless access device, wherein the wireless access device comprises a cellular transceiver and a Wi-Fi transceiver;

the wireless access device is configured to:
receive a cellular signal by using the cellular transceiver,
convert the cellular signal into a Wi-Fi signal,
send the Wi-Fi signal by using the Wi-Fi transceiver, and
upon determining that both a first preset condition and a second preset condition are met, reduce uplink transmit power of a cellular network, to reduce interference from the cellular signal to the Wi-Fi signal; and each of the plurality of Wi-Fi devices is configured to: receive the Wi-Fi signal and access a Wi-Fi network, wherein the first preset condition comprises: there is a Wi-Fi device whose received signal strength parameter and signal quality parameter are less than a first threshold in the plurality of connected Wi-Fi devices, the uplink transmit power of the cellular network is greater than or equal to a second threshold, and a received signal strength parameter and a signal quality parameter of the cellular network is greater than or equal to a third threshold, wherein a signal status parameter comprises a received signal strength parameter and a signal quality parameter, and the second preset condition comprises: a Wi-Fi rate of a Wi-Fi device with a smallest received signal strength parameter and a smallest signal quality parameter among the plurality of connected Wi-Fi devices is less than a fourth threshold, and an air interface throughput of the cellular network is greater than or equal to a fifth threshold.

2. The communications system according to claim 1, wherein the Wi-Fi device whose received signal strength parameter and signal quality parameter are less than the first threshold is a Wi-Fi device whose received signal strength parameter is less than a sixth threshold and whose signal quality parameter is less than a seventh threshold; and a received signal strength parameter and a signal quality parameter of the cellular network is greater than or equal to a third threshold comprises: the received signal strength parameter of the cellular network is greater than or equal to an eighth threshold, and the signal quality parameter of the cellular network is greater than or equal to a ninth threshold.

3. The communications system according to claim 1, wherein the first preset condition further comprises: there is a Wi-Fi device using 2.4G Wi-Fi, and a frequency band used by the cellular network has full-band interference to 2.4G Wi-Fi; or there is a Wi-Fi device using 5G Wi-Fi, and a frequency band used by the cellular network has interference to 5G Wi-Fi.

4. The communications system according to claim 1, wherein the wireless access device is further configured to:
when no Wi-Fi device is connected, or
when there is no Wi-Fi device whose signal status parameter is less than the first threshold in the plurality of connected Wi-Fi devices, or
when 2.4G Wi-Fi is used but 5G Wi-Fi is not used, and a frequency band used by the cellular network has no interference to 2.4G Wi-Fi, or
when 5G Wi-Fi is used but 2.4G Wi-Fi is not used, and the frequency band used by the cellular network has no interference to 5G Wi-Fi, or
when the received signal strength parameter of the cellular network is less than a tenth threshold, or
when the signal quality parameter of the cellular network is less than an eleventh threshold,
stop reducing the uplink transmit power of the cellular network.

5. The communications system according to claim 1, wherein the wireless access device is further configured to:
upon determining that there is a Wi-Fi device whose signal status parameter is less than the first threshold and there is a device using 2.4G Wi-Fi in the plurality of connected Wi-Fi devices, a frequency band used by the cellular network has full-band interference to 2.4G Wi-Fi, the uplink transmit power of the cellular network is greater than or equal to the second threshold, the signal status parameter of the cellular network is less than a twelfth threshold, the frequency band used by the cellular network has no interference to 5G Wi-Fi, and the plurality of connected Wi-Fi devices support 5G Wi-Fi, switch from 2.4G Wi-Fi to 5G Wi-Fi; or
upon determining that there is a Wi-Fi device whose signal status parameter is less than the first threshold and there is a device using 5G Wi-Fi in the plurality of connected Wi-Fi devices, the frequency band used by the cellular network has interference to 5G Wi-Fi, the uplink transmit power of the cellular network is greater than or equal to the second threshold, the signal status parameter of the cellular network is less than a twelfth threshold, the frequency band used by the cellular network has no interference to 2.4G Wi-Fi, and the plurality of connected Wi-Fi devices support 2.4G Wi-Fi, switch from 5G Wi-Fi to 2.4G Wi-Fi, wherein the signal status parameter of the cellular network is less than a twelfth threshold comprises: the received signal strength parameter of the cellular network is less than a tenth threshold, or the signal quality parameter of the cellular network is less than an eleventh threshold.

6. The communications system according to claim 1, wherein the wireless access device is further configured to:
upon determining that there is a Wi-Fi device whose signal status parameter is less than the first threshold and there is a device using 2.4G Wi-Fi in the plurality of connected Wi-Fi devices, a frequency band used by the cellular network has interference to 2.4G Wi-Fi, and the plurality of connected Wi-Fi devices support 5G Wi-Fi, switch from 2.4G Wi-Fi to 5G Wi-Fi; or
upon determining that there is a Wi-Fi device whose signal status parameter is less than the first threshold and there is a device using 5G Wi-Fi in the plurality of connected Wi-Fi devices, the frequency band used by the cellular network has interference to 5G Wi-Fi, and the plurality of connected Wi-Fi devices support 2.4G Wi-Fi, switch from 5G Wi-Fi to 2.4G Wi-Fi.

7. The communications system according to claim 1, wherein the second preset condition further comprises: there is a Wi-Fi device whose signal status parameter is less than the first threshold and there is a device using 2.4G Wi-Fi in the plurality of connected Wi-Fi devices, and a frequency band used by the cellular network has interference to 2.4G Wi-Fi; or
the second preset condition further comprises: there is a Wi-Fi device whose signal status parameter is less than the first threshold and there is a device using 5G Wi-Fi in the plurality of connected Wi-Fi devices, and the frequency band used by the cellular network has interference to 5G Wi-Fi.

8. The communications system according to claim 1, wherein the wireless access device is further configured to:
when no Wi-Fi device is connected, or
when there is no Wi-Fi device whose signal status parameter is less than the first threshold in the plurality of connected Wi-Fi devices, or
when 2.4G Wi-Fi is used but 5G Wi-Fi is not used, and a frequency band used by the cellular network has no interference to 2.4G Wi-Fi, or
when 5G Wi-Fi is used but 2.4G Wi-Fi is not used, and the frequency band used by the cellular network has no interference to 5G Wi-Fi, or
when the received signal strength parameter of the cellular network is less than a tenth threshold or the signal quality parameter of the cellular network is less than an eleventh threshold, and the Wi-Fi rate of the Wi-Fi device with the smallest signal status parameter is greater than or equal to a thirteenth threshold, or
when the received signal strength parameter of the cellular network is less than the tenth threshold or the signal quality parameter of the cellular network is less than the eleventh threshold, and the air interface throughput of the cellular network is less than a fourteenth threshold,
stop reducing the uplink transmit power of the cellular network.

9. The communications system according to claim 1, wherein the wireless access device is further configured to:
upon determining that there is a Wi-Fi device whose signal status parameter is less than the first threshold and there is a device using 2.4G Wi-Fi in the plurality of connected Wi-Fi devices, a frequency band used by the cellular network has interference to 2.4G Wi-Fi, the Wi-Fi rate of the Wi-Fi device with the smallest signal status parameter is less than the fourth threshold, the air interface throughput of the cellular network is less than a fourteenth threshold, the frequency band used by the cellular network has no interference to 5G Wi-Fi, and the plurality of connected Wi-Fi devices support 5G Wi-Fi, switch from 2.4G Wi-Fi to 5G Wi-Fi; or upon determining that there is a Wi-Fi device whose signal status parameter is less than the first threshold and there is a device using 5G Wi-Fi in the plurality of connected Wi-Fi devices, the frequency band used by the cellular network has interference to 5G Wi-Fi, the Wi-Fi rate of the Wi-Fi device with the smallest signal status parameter is less than the fourth threshold, the air interface throughput of the cellular network is less than the fourteenth threshold, the frequency band used by the cellular network has no interference to 2.4G Wi-Fi, and the plurality of connected Wi-Fi devices support 2.4G Wi-Fi, switch from 5G Wi-Fi to 2.4G Wi-Fi.

10. The communications system according to claim 1, wherein the received signal strength parameter comprises reference signal received power (RSRP) or a received signal strength indicator (RSSI); and
the signal quality parameter comprises a signal to interference plus noise ratio (SINR) or reference signal received quality (RSRQ).

11. A wireless access device, comprising:
one or more processors;
a cellular transceiver, configured to: receive a cellular signal;
a wireless fidelity (Wi-Fi) transceiver, configured to send a Wi-Fi signal; and
a memory storing one or more computer programs, the one or more computer programs comprising instructions that, when executed by the one or more processors, enable the wireless access device to perform operations comprising:
converting the cellular signal received by the cellular transceiver into the Wi-Fi signal; and
upon determining that both a first preset condition and a second preset condition are met, reducing uplink transmit power of a cellular network, to reduce interference from the cellular signal to the Wi-Fi signal, wherein
the first preset condition comprises: there is a Wi-Fi device whose received signal strength parameter and signal quality parameter are less than a first threshold in a plurality of Wi-Fi devices connected to the wireless access device, the uplink transmit power of the cellular network is greater than or equal to a second threshold, and a received signal strength parameter and a signal quality parameter of the cellular network is greater than or equal to a third threshold, wherein a signal status parameter comprises a received signal strength parameter and a signal quality parameter, and
the second preset condition comprises: a Wi-Fi rate of a Wi-Fi device with a smallest received signal strength parameter and a smallest signal quality parameter among the plurality of connected Wi-Fi devices is less than a fourth threshold, and an air interface throughput of the cellular network is greater than or equal to a fifth threshold.

12. The wireless access device according to claim 11, wherein the Wi-Fi device whose received signal strength parameter and signal quality parameter are less than the first threshold is a Wi-Fi device whose received signal strength parameter is less than a sixth threshold and whose signal quality parameter is less than a seventh threshold; and
that a received signal strength parameter and a signal quality parameter of the cellular network is greater than or equal to the third threshold comprises: the received signal strength parameter of the cellular network is greater than or equal to an eighth threshold, and the signal quality parameter of the cellular network is greater than or equal to a ninth threshold.

13. The wireless access device according to claim 11, wherein the first preset condition further comprises: there is a Wi-Fi device using 2.4G Wi-Fi, and a frequency band used by the cellular network has full-band interference to 2.4G Wi-Fi; or
the first preset condition further comprises: there is a Wi-Fi device using 5G Wi-Fi, and a frequency band used by the cellular network has interference to 5G Wi-Fi.

14. The wireless access device according to claim 11, wherein, when the instructions are executed by the one or more processors, the wireless access device is further enabled to perform operations comprising:
when no Wi-Fi device is connected, or
when there is no Wi-Fi device whose signal status parameter is less than the first threshold in the plurality of connected Wi-Fi devices, or
when 2.4G Wi-Fi is used but 5G Wi-Fi is not used, and a frequency band used by the cellular network has no interference to 2.4G Wi-Fi, or
when 5G Wi-Fi is used but 2.4G Wi-Fi is not used, and the frequency band used by the cellular network has no interference to 5G Wi-Fi, or
when the received signal strength parameter of the cellular network is less than a tenth threshold, or
when the signal quality parameter of the cellular network is less than an eleventh threshold,
stopping reducing the uplink transmit power of the cellular network.

15. The wireless access device according to claim 11, wherein when the instructions are executed by the one or more processors, the wireless access device is further enabled to perform operations comprising:
upon determining that there is a Wi-Fi device whose signal status parameter is less than the first threshold and there is a device using 2.4G Wi-Fi in the plurality of connected Wi-Fi devices, a frequency band used by the cellular network has full-band interference to 2.4G Wi-Fi, the uplink transmit power of the cellular network is greater than or equal to the second threshold, the signal status parameter of the cellular network is less than a twelfth threshold, the frequency band used by the cellular network has no interference to 5G Wi-Fi, and the plurality of connected Wi-Fi devices support 5G Wi-Fi, switching from 2.4G Wi-Fi to 5G Wi-Fi; or
upon determining that there is a Wi-Fi device whose signal status parameter is less than the first threshold and there is a device using 5G Wi-Fi in the plurality of connected Wi-Fi devices, the frequency band used by the cellular network has interference to 5G Wi-Fi, the uplink transmit power of the cellular network is greater than or equal to the second threshold, the signal status parameter of the cellular network is less than a twelfth threshold, the frequency band used by the cellular network has no interference to 2.4G Wi-Fi, and the plurality of connected Wi-Fi devices support 2.4G Wi-Fi, switching from 5G Wi-Fi to 2.4G Wi-Fi, wherein
that the signal status parameter of the cellular network is less than the twelfth threshold comprises: the received signal strength parameter of the cellular network is less than a tenth threshold, or the signal quality parameter of the cellular network is less than an eleventh threshold.

16. The wireless access device according to claim 11, wherein when the instructions are executed by the one or more processors, the wireless access device is further enabled to perform operations comprising:
  upon determining that there is a Wi-Fi device whose signal status parameter is less than the first threshold and there is a device using 2.4G Wi-Fi in the plurality of connected Wi-Fi devices, a frequency band used by the cellular network has interference to 2.4G Wi-Fi, and the plurality of connected Wi-Fi devices support 5G Wi-Fi, switching from 2.4G Wi-Fi to 5G Wi-Fi; or
  upon determining that there is a Wi-Fi device whose signal status parameter is less than the first threshold and there is a device using 5G Wi-Fi in the plurality of connected Wi-Fi devices, the frequency band used by the cellular network has interference to 5G Wi-Fi, and the plurality of connected Wi-Fi devices support 2.4G Wi-Fi, switching from 5G Wi-Fi to 2.4G Wi-Fi.

17. The wireless access device according to claim 11, wherein the second preset condition further comprises: there is a Wi-Fi device whose received signal strength parameter and signal quality parameter are less than the first threshold and there is a device using 2.4G Wi-Fi in the plurality of connected Wi-Fi devices, and a frequency band used by the cellular network has interference to 2.4G Wi-Fi; or
  the second preset condition further comprises: there is a Wi-Fi device whose received signal strength parameter and signal quality parameter are less than the first threshold and there is a device using 5G Wi-Fi in the plurality of connected Wi-Fi devices, and the frequency band used by the cellular network has interference to 5G Wi-Fi.

18. The wireless access device according to claim 11, wherein, when the instructions are executed by the one or more processors, the wireless access device is further enabled to perform operations comprising:
  when no Wi-Fi device is connected, or
  when there is no Wi-Fi device whose signal status parameter is less than the first threshold in the plurality of connected Wi-Fi devices, or
  when 2.4G Wi-Fi is used but 5G Wi-Fi is not used, and a frequency band used by the cellular network has no interference to 2.4G Wi-Fi, or
  when 5G Wi-Fi is used but 2.4G Wi-Fi is not used, and the frequency band used by the cellular network has no interference to 5G Wi-Fi, or
  when the received signal strength parameter of the cellular network is less than a tenth threshold or the signal quality parameter of the cellular network is less than an eleventh threshold, and the Wi-Fi rate of the Wi-Fi device with the smallest signal status parameter is greater than or equal to a thirteenth threshold, or
  when the received signal strength parameter of the cellular network is less than the tenth threshold or the signal quality parameter of the cellular network is less than the eleventh threshold, and the air interface throughput of the cellular network is less than a fourteenth threshold,
  stopping reducing the uplink transmit power of the cellular network.

19. The wireless access device according to claim 11, wherein, when the instructions are executed by the one or more processors, the wireless access device is further enabled to perform operations comprising:
  upon determining that there is a Wi-Fi device whose signal status parameter is less than the first threshold and there is a device using 2.4G Wi-Fi in the plurality of connected Wi-Fi devices, a frequency band used by the cellular network has interference to 2.4G Wi-Fi, the Wi-Fi rate of the Wi-Fi device with the smallest signal status parameter is less than the fourth threshold, the air interface throughput of the cellular network is less than a fourteenth threshold, the frequency band used by the cellular network has no interference to 5G Wi-Fi, and the plurality of connected Wi-Fi devices support 5G Wi-Fi, switching from 2.4G Wi-Fi to 5G Wi-Fi; or
  upon determining that there is a Wi-Fi device whose signal status parameter is less than the first threshold and there is a device using 5G Wi-Fi in the plurality of connected Wi-Fi devices, the frequency band used by the cellular network has interference to 5G Wi-Fi, the Wi-Fi rate of the Wi-Fi device with the smallest signal status parameter is less than the fourth threshold, the air interface throughput of the cellular network is less than the fourteenth threshold, the frequency band used by the cellular network has no interference to 2.4G Wi-Fi, and the plurality of connected Wi-Fi devices support 2.4G Wi-Fi, switching from 5G Wi-Fi to 2.4G Wi-Fi.

20. A chip, comprising a processor and a data interface, wherein
  the data interface is configured to obtain a cellular signal from a cellular transceiver;
  the processor is configured to demodulate the cellular signal to generate a demodulated signal, and modulate the demodulated signal to generate a modulated signal;
  the data interface is further configured to transmit the modulated signal to a wireless fidelity (Wi-Fi) transceiver; and
  the processor is further configured to: upon determining that both a first preset condition and a second preset condition are met, reduce uplink transmit power of a cellular network, to reduce interference from the cellular signal to a Wi-Fi signal, wherein
  the first preset condition comprises: there is a Wi-Fi device whose received signal strength parameter and signal quality parameter are less than a first threshold in a plurality of connected Wi-Fi devices, the uplink transmit power of the cellular network is greater than or equal to a second threshold, and a received signal strength parameter and a signal quality parameter of the cellular network is greater than or equal to a third threshold, and
  the second preset condition comprises: a Wi-Fi rate of a Wi-Fi device with a smallest received signal strength parameter and a smallest signal quality parameter among the plurality of connected Wi-Fi devices is less than a fourth threshold, and an air interface throughput of the cellular network is greater than or equal to a fifth threshold.

* * * * *